US011456815B2

(12) United States Patent
Brown et al.

(10) Patent No.: US 11,456,815 B2
(45) Date of Patent: Sep. 27, 2022

(54) DETERMINISTIC DYNAMIC NETWORK TRAFFIC SHAPING

(71) Applicant: SK3W TECHNOLOGIES INC., Princeton, NJ (US)

(72) Inventors: Jamie Aaron Brown, Princeton, NJ (US); Stephen Russell McWhirter, Hoboken, NJ (US); Elya Joseph Kapelyan, Tenafly, NJ (US); Craig John Mohan, River Forrest, IL (US)

(73) Assignee: SK3W TECHNOLOGIES INC., Princeton, NJ (US)

( * ) Notice: Subject to any disclaimer, the term of this patent is extended or adjusted under 35 U.S.C. 154(b) by 0 days.

(21) Appl. No.: 17/516,616

(22) Filed: Nov. 1, 2021

(65) Prior Publication Data

US 2022/0140933 A1 May 5, 2022

Related U.S. Application Data

(60) Provisional application No. 63/107,953, filed on Oct. 30, 2020.

(51) Int. Cl.
*H04J 14/02* (2006.01)
*H04L 43/0852* (2022.01)

(52) U.S. Cl.
CPC ................. *H04J 14/0227* (2013.01)

(58) Field of Classification Search
CPC .................. H04J 14/0227; H04L 43/0852
See application file for complete search history.

(56) References Cited

U.S. PATENT DOCUMENTS

| 10,785,144 | B2 | 9/2020 | Micallef | |
|---|---|---|---|---|
| 2007/0070914 | A1* | 3/2007 | Abigail | H04L 47/32 370/465 |
| 2011/0280568 | A1 | 11/2011 | Dvir et al. | |
| 2018/0146270 | A1 | 5/2018 | Jiang | |
| 2018/0191601 | A1* | 7/2018 | Micallef | H04L 43/0858 |
| 2018/0295144 | A1* | 10/2018 | Jackson | H04L 43/10 |
| 2019/0257715 | A1 | 8/2019 | Leiria et al. | |
| 2020/0196036 | A1 | 6/2020 | Eiselt | |

FOREIGN PATENT DOCUMENTS

WO 2017/206294 A1 12/2017

OTHER PUBLICATIONS

Yu, Minlan et al, "Latency Equalization as a New Network Service Primitive", IEEE/ACM Transactions on Networking, May 27, 2011, pp. 125-138, vol. 20, Issue: 1, Feb. 2012, IEEE (Year: 2012).*

* cited by examiner

Primary Examiner — Shi K Li
(74) Attorney, Agent, or Firm — Van Court & Aldridge LLP

(57) ABSTRACT

Systems, methods, and computer-readable media for deterministic dynamic shaping of traffic of a communication network are provided.

20 Claims, 13 Drawing Sheets

DETERMINISTIC DYNAMIC NETWORK TRAFFIC SHAPING

CROSS-REFERENCE TO RELATED APPLICATION(S)

This application claims the benefit of prior filed U.S. Provisional Patent Application No, 63/107,953, filed Oct. 30, 2020, which is hereby incorporated by reference herein in its entirety.

COPYRIGHT NOTICE

At least a portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to communication networks and, more particularly, to deterministic dynamic traffic shaping for communication networks and, more particularly, to latency equalized communication networks.

BACKGROUND OF THE DISCLOSURE

Many data transport networks have inherent endpoint to endpoint latency variations from source to destination end users depending on the location of each because all endpoints are at physically different locations. While such variation may be acceptable in many applications, certain specific data network use cases may lose effectiveness when all endpoints lack substantially similar latency.

SUMMARY OF THE DISCLOSURE

This document describes systems, methods, and computer-readable media for providing deterministic dynamic traffic shaping for communication networks.

For example, a system for controlling a communication network including a plurality of network communication nodes and a plurality of media links is provided. The system may include a first active ranging device and a first passive optical coupler device. The first active ranging device may include a first ranging device ("RD") port operative to be communicatively coupled to a first communication network node of the plurality of network communication nodes by a first media link of the plurality of media links, and a second RD port operative to be communicatively coupled to the first passive optical coupler device by a second media link of the plurality of media links. The first passive optical coupler device may include a first optical coupler ("OC") port operative to be communicatively coupled to a second communication network node of the plurality of network communication nodes by a third media link of the plurality of media links, and a second OC port operative to be communicatively coupled to the second RD port by the second media link. The first active ranging device may further include a first user traffic channel operative to communicatively couple the first RD port to the second RD port. The first active ranging device may further include a first ranging traffic channel operative to communicatively couple a first ranging channel calculator ("RCC") of the first active rang-ing device to the second RD port. The first passive optical coupler device may further include a first optical splitter and a first optical combiner, wherein the first optical splitter is operative to split first output RD data received by the second OC port into first RD user traffic data for the first OC port and first output ranging signal traffic data for the first optical combiner, and the first optical combiner is operative to combine the first output ranging signal traffic data from the first optical splitter and end user traffic data from the first OC port into first input RD data for the second OC port.

As yet another example, a system for controlling a communication network including a plurality of network communication nodes and a plurality of media links is provided. The system may include an active ranging device, a first passive optical coupler device, and a second passive optical coupler device. The active ranging device may include a first ranging device ("RD") port operative to be communicatively coupled to a first communication network node of the plurality of network communication nodes by a first media link of the plurality of media links, a second RD port operative to be communicatively coupled to the first passive optical coupler device by a second media link of the plurality of media links, a third RD port operative to be communicatively coupled to a third communication network node of the plurality of network communication nodes by a fourth media link of the plurality of media links, and a fourth RD port operative to be communicatively coupled to the second passive optical coupler device by a fifth media link of the plurality of media links. The first passive optical coupler device may include a first optical coupler ("OC") port operative to be communicatively coupled to a second communication network node of the plurality of network communication nodes by a third media link of the plurality of media links, and a second OC port operative to be communicatively coupled to the second RD port by the second media link. The second passive optical coupler device may include a third OC port operative to be communicatively coupled to a fourth communication network node of the plurality of network communication nodes by a sixth media link of the plurality of media links, and a fourth OC port operative to be communicatively coupled to the fourth RD port by the fifth media link. The active ranging device may further include a first user traffic channel operative to communicatively couple the first RD port to the second RD port, a second user traffic channel operative to communicatively couple the third. RD port to the fourth RD port, and a ranging traffic channel operative to alternate between communicatively coupling a ranging channel calculator ("RCC") of the active ranging device to the second RD port for transmitting a first ranging signal to the first passive optical coupler device via the second media link and receiving the first ranging signal back from the first passive optical coupler device via the second media link, and communicatively coupling the RCC to the fourth RD port for transmitting a second ranging signal to the second passive optical coupler device via the fifth media link and receiving the second ranging signal back from the second passive optical coupler device via the fifth media link.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Figure 1:
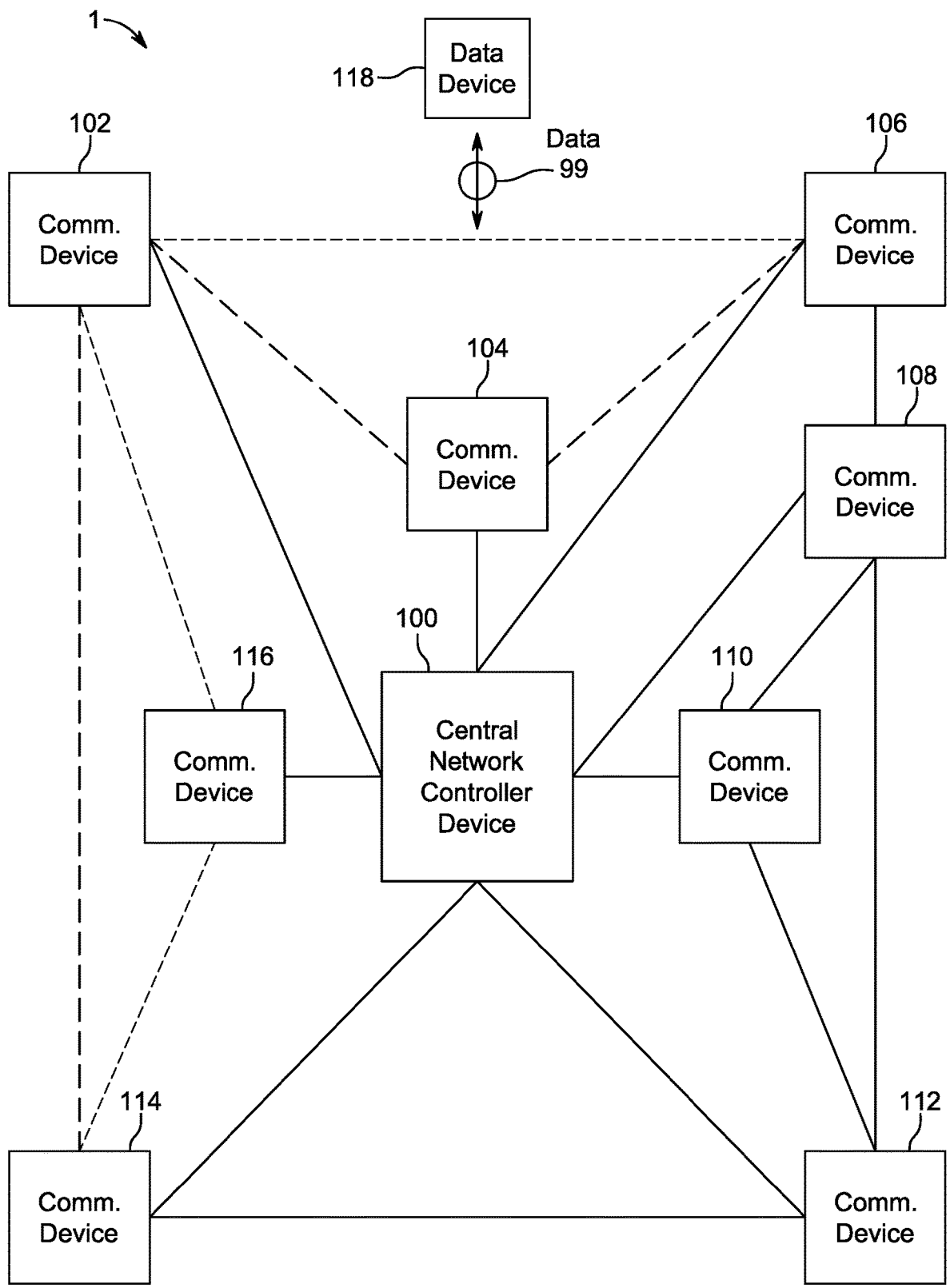
FIG. 1 is a schematic diagram illustrating a system including a portion of a communication network including multiple communication devices and a central network controller device, according to some embodiments of the disclosure.

Systems, methods, and computer-readable media for providing deterministic dynamic traffic shaping for communication networks are provided.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein may refer to and encompass any and all possible combinations of one or more of the associated listed items. The terms "includes," "including," "comprises," and/or "comprising," when used in this specification, may specify the presence of stated features, integers, steps, operations, elements, and/or components, but do not preclude the presence or addition of one or more other features, integers, steps, operations, elements, components, and/or groups thereof.

The term "if" may, optionally, be construed to mean "when" or "upon" or "in response to determining" or "in response to detecting," depending on the context. Similarly, the phrase "if it is determined" or "if [a stated condition or event] is detected" may, optionally, be construed to mean "upon determining" or "in response to determining" or "upon detecting [the stated condition or event]" or "in response to detecting [the stated condition or event]," depending on the context.

As used herein, the terms "computer," "personal computer," "device," "computing device," "router device," and "controller device" may refer to any programmable computer system that is known or that will be developed in the future. in certain embodiments, a computer may be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system" may be intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. one or more components may reside within a process and/or thread of execution and a component may be localized on one computer and/or distributed between two or more computers.

Data communication may include the process of using digital networks to transfer data between participating parties. Digital data may include a sequence of ones and zeros arranged in a specific order and grouped in data packets, each of which may be a unit of data made into a single package that may be configured to travel along a given network path to create meaningful communication. Latency may be the measure of time it takes for a data packet to traverse from one end of a network connection to the other. Round trip delay ("RTD") may be the time it takes for a packet to travel from one end of the network to the other and back to the original point. Ultimately, latency may be a measure of the time it takes to travel between two points at the speed of light through a given media. Data networks may utilize transport media to carry data packets from one point to another. Media may include, but are not limited to, the atmosphere, gasses, optical fiber, metallic cables, and/or the like (e.g., spools of fiber-optic cable and/or multiple patch cables). Transport media in data transport networks may have a variable or different propagation delay as a percentage of the speed of light. A network's resultant latency of a transmission may be the computation of the distance of the media multiplied by the propagation delay as a percentage of the speed of light specific to the media. Most data transport networks may include inherent endpoint to endpoint latency variations from source to end users that may depend on the location of each, as all endpoints are usually at physically different locations. This difference can be measured from millimeters to kilometers and, therefore, in terms of latency from picoseconds or nanoseconds to seconds. While this variation may be acceptable in most applications, some specific uses of data networks may require or prefer all endpoints to have substantially similar latency. Some examples of this may include, but are not limited to, financial trading of equities derivatives and/or other electronically traded, fungible instruments, e-sports, online gaming, extended reality ("XR") interactions (e.g., virtual reality ("VR"), mixed reality ("MR"), augmented reality ("AR"), etc.), video communications, and/or the like. In such applications, a variance of latency can and usually does confer advantage or disadvantage to certain individual participants in a competitive environment, such as in e-sports or market trading. The resultant effect may directly impact the gain or loss of money as well as the possibility of winning or losing competition due to the latency experienced by each participant. In such scenarios, the latency of the data transport network may be a determining factor in the outcome of competing participants. A deterministic dynamic traffic shaped communication network or a latency equalized network ("LEN") of this disclosure may be configured to remove or substantially reduce that latency factor and can level the playing field for all participants (e.g., introduce deterministic, measurable and equitable network performance). importance, therefore, can be placed not on the latency, but on a competitive environment in which the skill or ability of the competitors determines the win or loss.

In a data center-hosted trading environment, a trading venue (e.g., New York Stock Exchange ("NYSE"), Chicago Mercantile Exchange ("CME"), London Metal Exchange ("LME"), etc.) may be located in one part of a building and market participants may be hosted in another. Racks of computers may be required to be spread around a large physical space due to constraints in delivery of power and/or dissipation of heat. Therefore, it may be difficult for any two computers or servers in a data center to have the same latency back to the trading venue. There is often a variation in the delay because all connections may be bound by the speed of light, while technology may operate at a high enough speed where the speed of light may be the limiting factor.

A deterministic dynamic traffic shaping solution (e,g., a latency equalization solution or other suitable solution) for communication networks of this disclosure may provide network operators and end users an opportunity to simplify, accelerate, and secure a communication process for all participants by replacing current systems, which may use mostly hardware, with an electronically dynamic system. This electronically dynamic system may include custom circuits that may be managed by an automated software process that may not necessitate the storage of fibers between market participants. This may create opportunities for more members, as storage space and distance from a matching engine in a data center may no longer be a limitation.

When fibers running through a data center may no longer determine the latency equalization, there may not be a way to manipulate the length of the fiber to create any advantages, accidental or intentional, or to exploit the system for the benefit or detriment of only certain participants. A network of this disclosure may provide surety that all participants have fair and equal access to the utilization of the network (e.g., receiving market data and/or placing orders). In addition, there may be a guarantee that communication of participant data (e.g., placement of orders and/or receipt of market data) may be delivered at substantially the exact same time to and from all endpoints. Both of these are advantages that may be impossible to guarantee with a physical fiber. Using proprietary metadata, exact reports of all packets traversing a network of this disclosure may be generated that can be instantly accessed and recorded for future reference.

This system may include a managed or unmanaged component, which may be operative to offer data repacketization. Where accuracy and/or reporting may be required, a latency insertion engine or deterministic dynamic traffic shaping engine, which may be referred to herein as a BitSpooler or bitspooler, can be deployed, where such a bitspooler may be a device that may be inserted at a single point in a data transmission link that can determine the natural latency of the link and can be used to help insert a custom calculated delay to each link in order to equalize all links in a system.

A network of this disclosure may provide a solution to various problems with certain communication networks, such as latency problems within market trading and/or e-gaming, by replacing a majority of hardware used at data centers with a system that may eliminate using and storing multiple fibers and instead may use a combination of circuits and innovative software that may allow trade related data, such as but not limited to, market data, trade orders, executed order notifications, and/or the like, to be delivered fairly (e.g., in 3 nanoseconds or less) while also providing automated reports for market data use and/or other communication data use. A network of this disclosure may make competitive activity on networks fairer by disallowing unnatural fiber or other media advantages. A network of this disclosure may considerably diminish the amount of physical space required for storing fiber in data centers. A network of this disclosure may impart an electronically dynamic, automated system that may provide any suitable data (e.g., daily market data reports). A network of this disclosure may be configured to deliver and timestamp data (e.g., trade data and orders) to all participants in a network in a timely window, thereby providing improved accuracy and speed. A network of this disclosure (e.g., a. field-programmable gate array ("FPGA") based network) may be configured to utilize a single fiber that may be coupled to a centralized computer (e.g., controller device 100 of FIG. 1 (e.g., a BitSpooler)) from which matching engines may examine, time stamp, and/or sort data (e.g., orders) for both input and output. A path for developing hardware for a network of this disclosure may be to build a custom circuit board and custom enclosure, which may include, but is not limited to, any suitable number of exchange side interfaces, such as (1) data (e.g., 4×10 G), (2) control (e.g., category 5 cable ("Cat 5") GigE), and (3) clock (e.g., low voltage differential signaling ("LVDS") over Cat 5), any suitable number of participant interfaces, such as (1) 8×small form-factor pluggable ("SFP") at 10 G (e,g., zero latency copy market data/order entry; striped reduced serialization across all 8), (2) LVDS input connector+INDS output connector for attachment of a network approved box (e.g., as may be provided by Bittware Only), and/or a board that may be exactly or substantially the same board in a Participant Box.

FIG. 1 is a schematic diagram illustrating a portion of any suitable communication network system 1 that may include any suitable network of any suitable number of any suitable type(s) of communication devices (e.g., router devices, end user devices, etc.), such as communication ("comm.") devices 102, 104, 106, 108, 110, 112, 114, and 116. As shown, in some embodiments, the network may also include any suitable type of central network controller device 100. The dashed lines may indicate two alternate routes between device 106 and device 114. One route, indicated by a short dashed line, passes through intermediate devices 102 and 116. Another route, indicated by a long dashed line, passes through intermediate devices 104 and 102. In other embodiments, there may only be a single route between two devices. In these embodiments, a central controller 100 may not be necessary and may be eliminated. In some embodiments, a communication device may query central controller 100 as needed to determine a route to forward a packet over. As shown in FIG. 1, system 1 may also include one or more data devices, such as data device 118, which may be a source of any suitable data 99 that may be communicatively coupled to one, some, or each of devices 100-116 in any suitable manner for sharing any suitable data with the device(s) of the network for any suitable purpose.

Figure 1A:
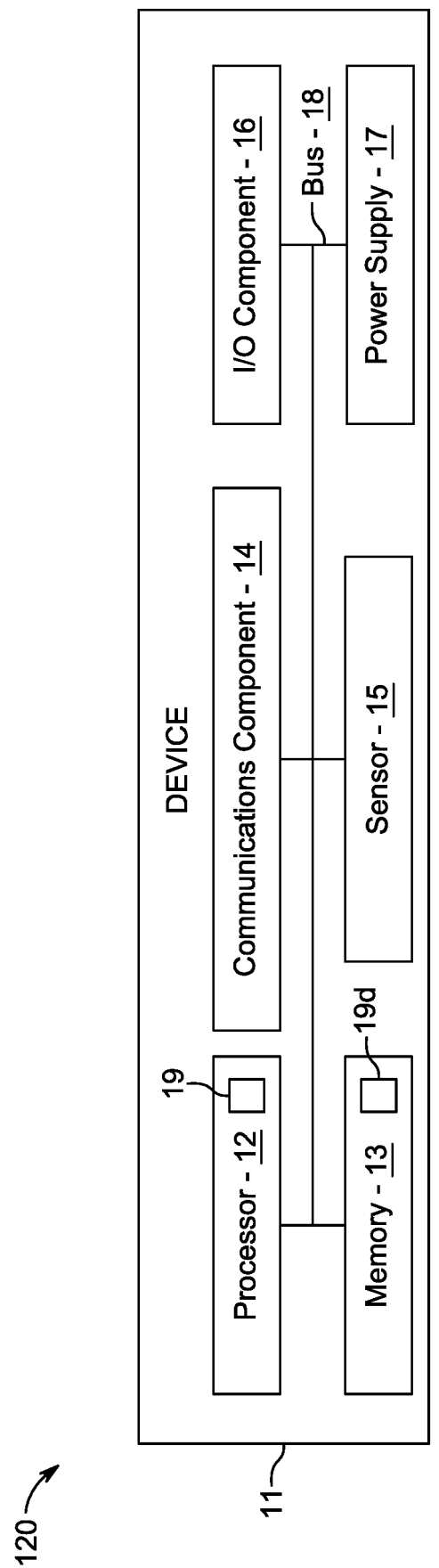
FIG. 1A is a more detailed schematic view of a system device of the system of FIG. 1.

As shown in FIG. IA, a system device 120 (e.g., one, some, or each of devices 100-118 of system 1 of FIG. 1) may include a processor component 12, a memory component 13, a communications component 14, a sensor 15, an input/output ("I/O") component 16, a power supply component 17, a housing 11, and/or a bus 18 that may provide one or more wired or wireless communication links or paths for transferring data and/or power to, from, or between various other components of device 120. In some embodiments, one or more components of device 120 may be combined or omitted. Moreover, device 120 may include other components not combined or included in FIG. 1A and/or several instances of the components shown in FIG 1A. the sake of simplicity, only one of each of the components of device 120 is shown in FIG. 1A. I/O component 16 may include at least one input component (e.g., button, mouse, keyboard, etc.) to receive information from a user and/or at least one output component (e.g., audio speaker, video display, haptic component, etc.) to provide information to a user, such as a touch screen that may receive input information through a user's touch of a display screen and that may also provide visual information to a user via that same display screen. Memory 13 may include one or more storage mediums or media, including for example, a hard-drive, flash memory, permanent memory such as read-only memory ("ROM"), semi-permanent memory such as random access memory ("RAM"), any other suitable type of storage component, or any combination thereof (e.g., for storing any suitable data (e.g., data 19d)). Communications component 14 may be provided to allow device 120 to communicate with one or more other devices 120 (e.g., any device communication to/from/between devices) 100-118 of system 1) using any suitable communications protocol. Communications component 14 can be operative to create or connect to a communication network or link of a network. Communications component 14 can provide wireless communications using any suitable short-range or long-range communications protocol, such as Wi-Fi (e.g., an 802.11 protocol), Bluetooth, ultra-wideband, radio frequency systems (e.g., 1200 MHz, 2.4 GHz, and 5.6 GHz communication systems), near field communication ("NFC"), infrared, protocols used by wireless and cellular telephones and personal e-mail devices, or any other protocol supporting wireless communications. Communications component 14 can also be operative to connect to a wired communications link or directly to another data source wirelessly or via one or more wired connections or other suitable connection type(s). Communications component 14 may be a network interface that may include the mechanical, electrical, and/or signaling circuitry for communicating data over physical links that may be coupled to other devices of a network. Such network interface(s) may be configured to transmit and/or receive any suitable data using a variety of different communication protocols, including, but not limited to, TCP/IP, UDP, ATM, synchronous optical networks ("SONET"), any suitable wired protocols or wireless protocols now known or to be discovered, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 15 may be any suitable sensor that may be configured to sense any suitable data for device 120 (e.g., location-based data via a CIPS sensor system, motion data, environmental data, biometric data, etc.). Sensor 15 may be a sensor assembly that may include any suitable sensor or any suitable combination of sensors operative to detect movements of device 120 and/or of any user thereof and/or any other characteristics of device 120 and/or of its environment (e.g., physical activity or other characteristics of a user of device 120, light content of the device environment, gas pollution content of the device environment, noise pollution content of the device environment, altitude of the device, etc.). Sensor 15 may include any suitable sensor(s), including, but not limited to, one or more of a GPS sensor, wireless communication sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 15 may include any suitable sensor components or subassemblies for detecting any suitable movement of device 120 and/or of a user thereof. For example, sensor 15 may include one or more three-axis acceleration motion sensors (e.g., an accelerometer) that may be operative to detect linear acceleration in three directions (i.e., the x- or left/fight direction, the y- or cep/down direction, and the z- or forward/backward direction). As another example, sensor 15 may include one or more single-axis or two-axis acceleration motion sensors that may be operative to detect linear acceleration only along each of the x- or left/right direction and the y- or up/down direction, or along any other pair of directions. In some embodiments, sensor 15 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 15 may be operative to directly or indirectly detect rotation, rotational movement, angular displacement, tilt, position, orientation, motion along a non-linear (e,g., arcuate) path, or any other non-linear motions. Additionally or alternatively, sensor 15 may include one or more angular rate, inertial, and/or gyromotion sensors or gyroscopes for detecting rotational movement. For example, sensor 15 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 15 for detecting motion on device 120, such as any suitable pressure sensors, altimeters, or the like. Using sensor 15, device 120 may be configured to determine a velocity, acceleration, orientation, and/or any other suitable motion attribute of device 120. One or more biometric sensors may be multi-modal biometric sensors and/or operative to detect long-lived biometrics, modem liveness (e.g., active, passive, etc.) biometric detection, and/or the like. Sensor 15 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to device 120 for attempting to authenticate a user), line-in connector for data and/or power, and/or combinations thereof. In some examples, each sensor can be a separate device, while, in other examples, any combination of two or more of the sensors can be included within a single device. For example, a gyroscope accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Device 120 can further include a timer that can be used, for example, to add time dimensions to various attributes of any detected element(s). Sensor 15 may include any suitable sensor components or subassemblies for detecting any suitable characteristics of any suitable condition of the lighting of the environment of device 120. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of device 120 (e.g., in lux or lumens per square meter, etc.) and/or for determining the ambient color or white point chromaticity of ambient light in the environment of device 120 (e.g., in hue and colorfulness or in x/y parameters with respect to an x-y chromaticity space, etc.) and/or for determining the UV index or UV radiation in the environment of device 120 (e.g., in UV index units, etc.). Sensor 15 may include any suitable sensor components or subassemblies for detecting any suitable characteristics of any suitable condition of the air quality of the environment of device 120. For example, sensor 15 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of device 120 (e.g., in $O_2$% per liter, etc.) and/or for determining the air velocity of the ambient air in the environment of device 120 (e.g., in kilograms per second, etc. and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of device 120 (e.g., in HG % per liter, etc.) and/or for determining the humidity of the ambient air in the environment of device 100 (e.g., in grams of water per cubic meter, etc. (e.g., using a hygrometer)) and/or for determining the temperature of the ambient air in the environment of device 120 (e.g., in degrees Celsius, etc. (e.g., using a thermometer)). Sensor 15 may include any suitable sensor components or subassemblies for detecting any suitable characteristics of any suitable condition of the sound quality of the environment of device 120. For example, sensor 15 may include any suitable sound quality sensor that may include, but is not limited to, one or more microphones or the like that may determine the level of sound pollution or noise in the environment of device 120 (e.g., in decibels, etc.). Sensor 15 may also include any other suitable sensor for determining any other suitable characteristics about a user of device 120 and/or the environment of device 120 and/or any situation within which device 120 may be existing. For example, any suitable clock and/or position sensor(s) may be provided to determine the current, time and/or time zone within which device 120 may be located. Sensor 15 may be embedded in a body (e.g., housing 11) of device 120, such as along a bottom surface that may be operative to contact a user, or can be positioned at any other desirable location. In some examples, different sensors can be placed in different locations inside or on the surfaces of device 120 (e.g., some located inside housing 11 and some attached to an attachment mechanism (e.g., a wrist band coupled to a housing of a wearable device), or the like). In other examples, one or more sensors can be worn by a user separately as different parts of a single device 120 or as different devices. In such cases, the sensors can be configured to communicate with device 120 using a wired and/or wireless technology (e.g., via communications component 14). In some examples, sensors can be configured to communicate with each other and/or share data collected from one or more sensors.

Power supply 17 can include any suitable circuitry for receiving and/or generating power, and for providing such power to one or more of the other components of device 120. For example, power supply assembly 17 can be coupled to a power grid (e.g., when device 120 is not acting as a portable device or when a battery of the device is being charged at an electrical outlet with power generated by an electrical power plant). As another example, power supply assembly 17 may be configured to generate power from a natural source (e.g., solar power using solar cells). As another example, power supply assembly 17 can include one or more batteries for providing power (e.g., when device 120 is acting as a portable device). Device 120 may also be provided with a housing 11 that may at least partially enclose one or more of the components of device 120 for protection from debris and other degrading forces external to device 120. Each component of device 120 may be included in the same housing 11 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, device 120 may include other components not combined or included in those shown or several instances of the components shown.

Processor 12 may be used to run one or more applications, such as an application 19 that may be accessible from memory 13 (e.g., as a portion of data 19*d*) and/or any other suitable source (e.g., from any other device in its system). Application 19 may include, but is not limited to, one or more operating system applications, firmware applications, communication applications (e.g., for enabling communication of data between devices), third party service applications, Internet browsing applications (e.g., for interacting with a website provided by a third party subsystem (e.g., a device 118 with a network device 100-116)), application programming interfaces ("APIs"), software development kits ("SDKs"), proprietary (e.g., Sk3w™) applications (e.g., a web application or a native application) for enabling device 120 to interact with an online service and/or one or more data devices 118 and/or the like, which may include applications for routing protocols, SDN modules based on OpenFlow, P4, or other network data plane programming standards, machine learning algorithms, network management functions, etc., any other suitable applications, such as applications for deterministic dynamic traffic shaping and, more particularly, in some embodiments, to equalizing latency in a multi-participant data network environment (es., application 319), and/or the like. For example, processor 12 may load an application 19 as an interface program to determine how instructions or data received via an input component of I10 component 16 or other component of device 120 (e.g., sensor 15 and/or communications component 14) may manipulate the way in which information may be stored (e.g., in memory 13) and/or provided via an output component of I/O component 16 and/or communicated to another system device via communications component 14. As one example, application 19 may be a third party application that may be running on device 120 (e.g., an application associated with the network of system 1 and/or data device 118) that may be loaded on device 120 in any suitable manner, such as via an application market (e.g., using communications component 14), such as the Apple App Store or Google Play, or that may be accessed via an internet application or web browser (e.g., by Apple Safari or Google Chrome) that may be running on device 120 and that may be pointed to a uniform resource locator ("URL") whose target or web resource may be managed by or otherwise affiliated with any suitable entity. Any device (e.g., any communication device or controller device of a network) may include any suitable special purpose hardware (e.g., hardware support of high-speed packet processing, hardware support of machine learning algorithms, etc.).

Device 120 may be any portable, mobile, wearable, implantable, or hand-held electronic device configured to operate with system 1. Alternatively, device 120 may not be portable during use, but may instead be generally stationary. Device 120 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, kiosk, beacon, server, and any combinations thereof that may be useful as a node of a network (e.g., devices 100-116) and/or as a data device (e.g., device 118).

A system of components has been developed that allows for deterministic dynamic traffic shaping and, more particularly, in some embodiments, to equalizing latency in a multi-participant data network environment (e.g., when it desired that some or all connections in the network have the same latency between end points).

Figure 2:
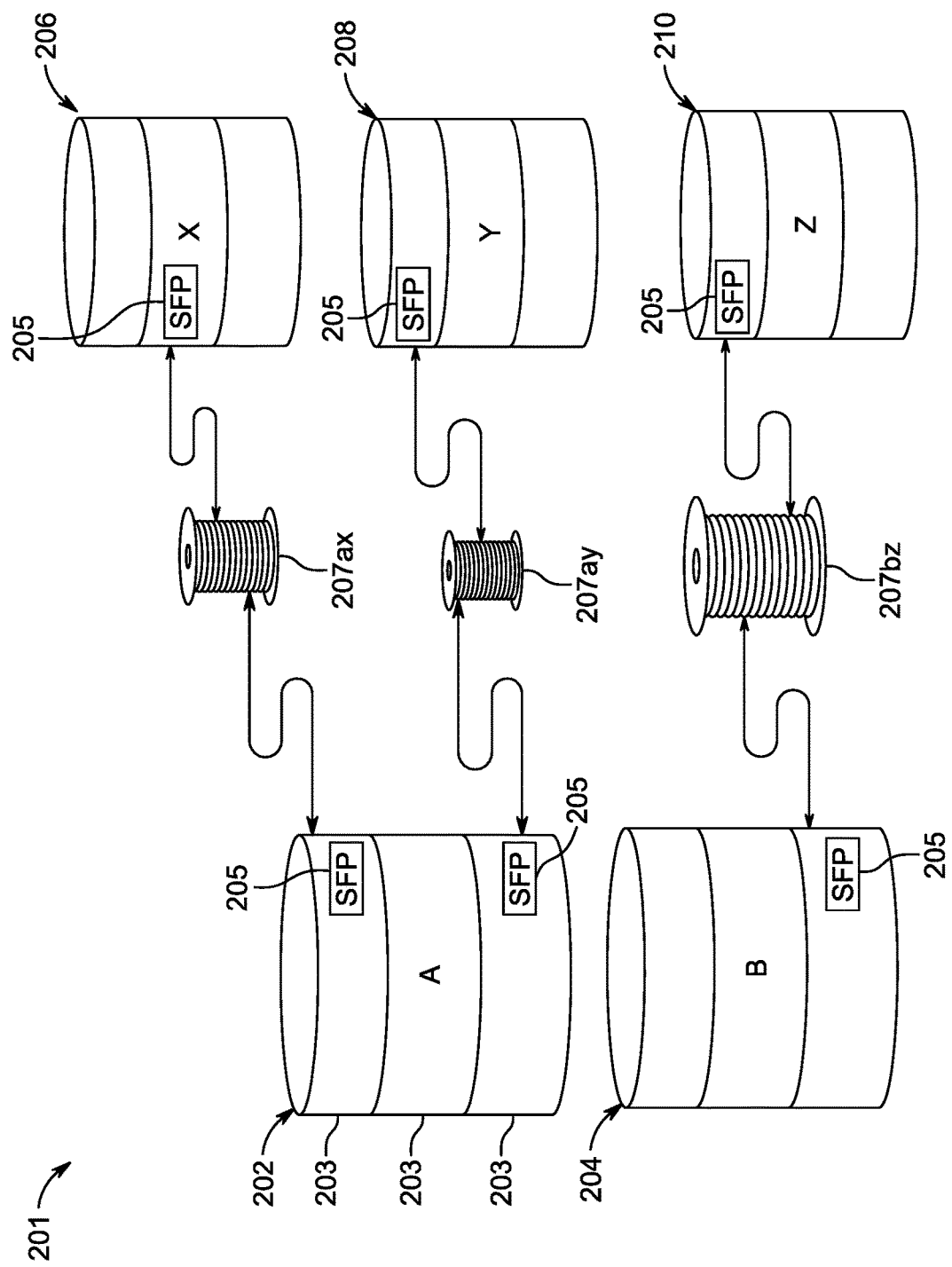
FIG. 2 is a schematic diagram illustrating another system including a portion of a communication network including multiple communication devices, according to some embodiments of the disclosure.

In some networked environments, the latencies between different sets of end points are rarely, if ever, equal, and the network operator may have limited control over traffic shape. In some embodiments, such as data centers that may need to have some control over latencies, such control may be exercised by physically adding spools of fiber-optic cable and/or multiple patch cables. For example, as shown in FIG. 2, a communication network system 201 may include any suitable number of communication devices (e.g., router devices, end user devices, etc.), such as communication ("comm.") devices 202 (e.g., server A), 204 (e.g., server B), 206 (e.g., server X), 208 (e.g., server Y), and 210 (e.g., server Z), where each communication device may include any suitable number of network connection nodes 203 (e.g., 3 network connection nodes 203 per user communication device as shown in FIG. 2, although it is to be understood that different communication devices may have different numbers of network connection nodes). One or more network connection nodes 203 of a communication device ("CD") may be provided with or otherwise include any suitable network interface module that may be operative to provide any suitable interface for any suitable ports. For example, a small form-factor pluggable ("SFP") may be a compact, hot-pluggable network interface module that may be used for both telecommunication and data communications applications, where such an SFP interface on networking hardware may be a modular slot for a media-specific transceiver in order to connect a fiber-optic cable or sometimes a copper cable or other suitable media. An advantage of using SFPs compared to fixed interfaces (e.g., modular connectors in Ethernet switches) may be that individual ports can be equipped with any suitable type of transceiver as needed. An SEP may be operative to carry out any suitable bi-directional electrical to optical translation at any suitable speed (e.g., 10 gigabits/second, 25 gigabits/second, 50 gigabits/second, 100 gigabits/second, etc.). As shown in FIG. 2, an SFP may be provided as a network interface module 205 of one, some, or each network connection node 203 of one, some, or each communication device of system 201, although it is to be understood that any other suitable type of network interface module may be provided at any network connection node of any communication device for supporting any suitable communication standards. An interconnect between a network interface module 205 (e.g., SFP) of a network connection node 203 of a first communication device and a network interface module 205 (e.g., SFP) of a network connection node 203 of a second communication device may include any suitable media link or number of suitable media links that may be provided by any suitable type or types of media for communicatively coupling the network connection nodes while supporting any suitable communication standards. For example, as shown in FIG. 2, a first spool or amount 207*ax* of fiber-optic cable may communicatively couple a network interface module 205 (e.g., SFP) of a network connection node 203 of communication device 202 to a network interface module 205 (e.g., SFP) of a network connection node 203 of communication device 206, a second spool or amount 207ay of fiber-optic cable may communicatively couple another network interface module 205 (e.g., SFP) of another network connection node 203 of communication device 202 to a network interface module 205 (e.g., SFP) of a network connection node 203 of communication device 208, and a third spool or amount 207bz of fiber-optic cable may communicatively couple a network interface module 205 (e.g., SFP) of a network connection node 203 of communication device 204 to a network interface module 205 (e.g., SFP) of a network connection node 203 of communication device 210. As shown, communication device to communication device ("CD-CD") media link spools 207ax, 207ay, and 207bz may be of different lengths or other differing properties that may result in different latencies for the different interconnects (e.g., spool 207ax may provide a latency or $t_{Delay}$ of 60 microseconds, spool 207ay may provide a latency or $t_{Delay}$ of 58 microseconds, while spool 207bz may provide a latency or $t_{Delay}$ of 62 microseconds).

In order to control such differing latencies (e.g., for equalizing the latency of each of the interconnects between network connection nodes of such a system 201), a length of one or more spools of fiber optic-cable may be physically adjusted and/or one or more patch cables may be added. However, such approaches may have various downsides. For example, in reality, the adjustments may be for cable length, and may be only indirectly for latency. Any manufacturing variation for the cables may also affect latency. As another example, different protocols and different packet sizes may result in different latency. As yet another example, there may be no way to actively monitor the cable latencies in a live environment, such that there may be no way to validate continuously the integrity of a latency standardized system. Instead, in order to measure cable latencies for such a system, the following may be done: (i) the spool of cable may be disconnected at both ends (e.g,. from each network interface module 205 (e,g., SFP) of each network connection node 203 of each of the two communication devices); (ii) a time domain reflectometry ("TDR") meter may be attached to one end; (iii) a latency measurement may be made and manually noted; and (iv) the cable may be reattached. Therefore, if there are any changes to the network topology, all of the foregoing operations may have to be repeated to determine the current latencies of the interconnects of the system. Any network upgrade may be an all or nothing scenario, whereby, if an operator's goal is to maintain a given state of the network, then changing the length of one cable may result in having to change all the other cables. However, the use of BitSpooler(s) in the system may obviate this need to change all the other cables, In situations where an operator may not control the physical cables, the operator may be at the mercy of the entity installing the cables. For every separate patch cable that may be added, the signal to noise ratio ("SNR") on the cable may go down. As yet another example, such a system may operate on trust and may not be tamper-proof or tamper-aware. A change in the topology of a network may be detected and the BitSpooler(s) of the system may be updated and adjusted accordingly.

Another type of interconnect scheme may be provided that can solve some or all of these problems, while also adding additional capabilities, Such an interconnect scheme may include a combination of at least one active component or device, which may be referred to herein as an active ranging and data delay device ("RD"), and at least one other component or device, which may be referred to herein as a latency standardization demarcation point ("LSDP") or optical coupler, that may be communicatively coupled to the RD via any suitable media link or number of suitable media links (e.g., one or more unknown media links) that may be provided by any suitable type or types of media while supporting any suitable communication standards (e.g., a spool of fiber-optic cable). While the RD may be an active device, the LSDP can be either a passive device or an active device. When combined (e.g., communicatively coupled by any known or unknown media link(s)), an RD and at least one LSDP may be referred to herein as a latency insertion engine or deterministic dynamic traffic shaping engine or "BitSpooler". A BitSpooler may be configured to allow for electronically modifying latencies within a network instead of physically modifying them. Consequently, a BitSpooler may add both observability and controllability to an existing network. Conceptually, the passive wiring of a system may be replaced by at least one RD and one or more LSDPs along with any suitable communication media link(s) therebetween. A BitSpooler may be configured to offer one or more of the following benefits: (i) it may measure and control latency rather than cable length; (ii) components of the BitSpooler can be introduced into an existing network piece-meal without disrupting the existing network; (iii) the BitSpooler functionality can be activated on a per-link basis; (iv) the SNR on the media link(s) fiber-optic cable(s)) may not be reduced, thereby providing greater margin for a network operator; and latency controls may be enabled electronically rather than physically, which offer one or more of the following benefits: (iva) the BitSpooler may be customer equipment agnostic; (ivb) the BitSpooler may be transparent to end-users and/or, equivalently, non-intrusive to customer data; (ivc) the BitSpooler may not depend on who controls the physical media link(s) (e.g., fiber-optic cable(s)), the BitSpooler may enable the interconnect(s) to be tamper-proof; and/or (ivd.) the BitSpooler may enable continuous measurement/monitoring of latency (e.g., as opposed to one-time measurement).

Figure 3:
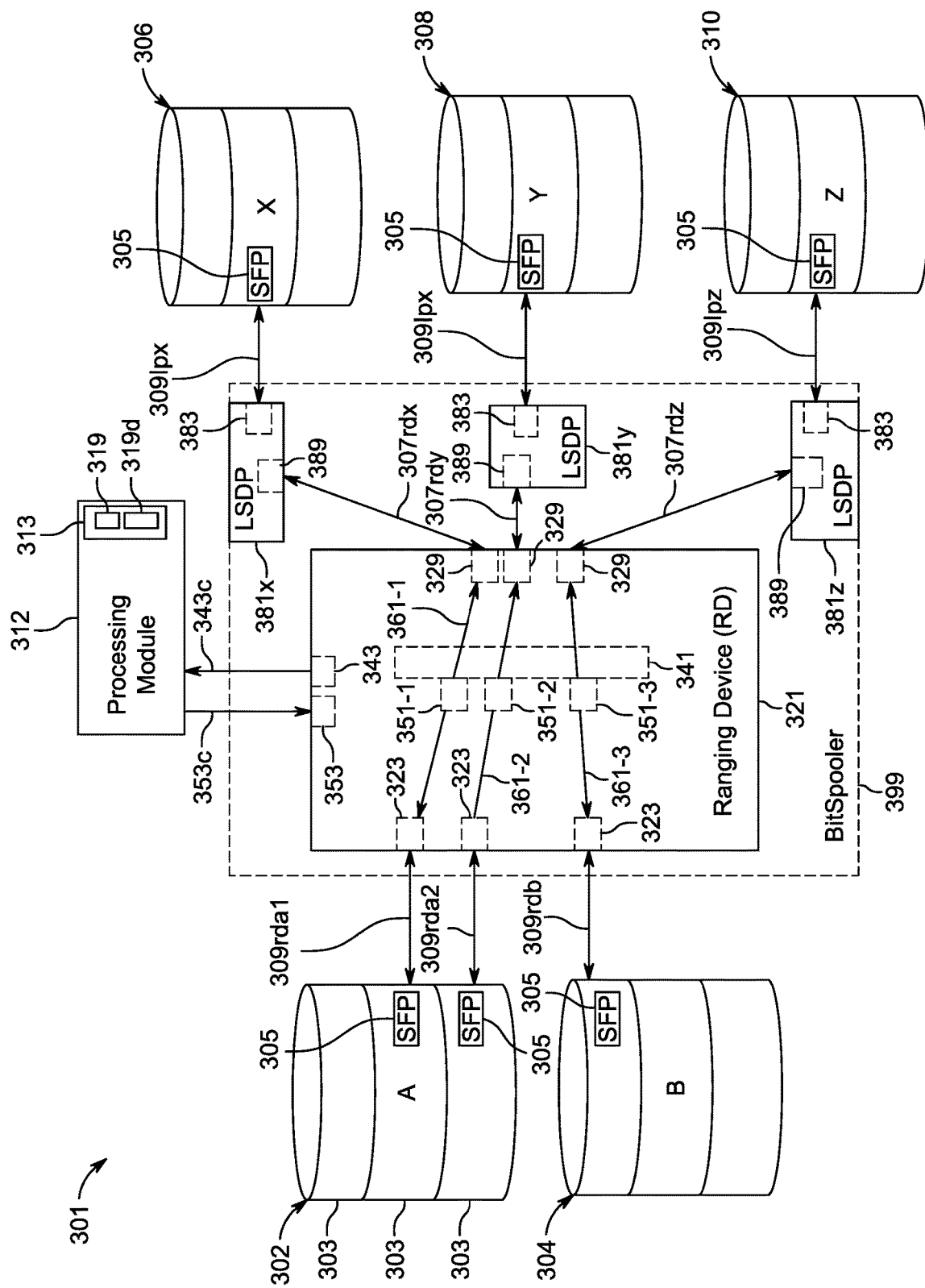
FIG. 3 is a schematic diagram illustrating another system including a portion of a communication network including multiple communication devices and a deterministic dynamic traffic shaping engine, according to some embodiments of the disclosure.

An exemplary system including such a BitSpooler interconnect scheme may be shown by a communication network system 301 of FIG. 3. For example, as shown in FIG. 3, system 301 may include any suitable number of communication devices (e.g., router devices, end user devices, etc.), such as communication ("comm.") devices 302 (e.g., server A), 304 (e.g., server 306 (e.g., server X), 308 (e.g., server Y), and 310 (e.g., server Z), where each communication device may include any suitable number of network connection nodes 303 (e.g., 3 network connection nodes 203 per user communication device as shown in FIG. 3, although it is to be understood that different communication devices may have different numbers of network connection nodes). One or more network connection nodes 303 of a communication device may be provided with or otherwise include any suitable network interface module that may be operative to provide any suitable interface for any suitable ports. As shown in FIG. 3. an SFP may be provided as a network interface module 305 of one, some, or each network connection node 303 of one, some, or each communication device of system 301, although it is to be understood that any other suitable type of network interface module may be provided at any network connection node of any communication device for supporting any suitable communication standards. An interconnect between a network interface module 305 (e.g., SFP) of a network connection node 303 of a first communication device and a network interface module 305 (e.g., SFP) of a network connection node 303 of a second communication device may include a BitSpooler and any suitable number of media links that may be provided by any suitable type or types of media for communicatively coupling the network connection nodes to the BitSpooler and for communicatively coupling components of the Bit-Spooler (e.g., an RD and an LSDP) to one another while supporting any suitable communication standards.

As shown in FIG. 3, a BitSpooler 399 may include any suitable number of LSDPs (e.g., three LSDPs 381$x$, 381$y$, and 381$z$) and an RD 321. RD 321 may include any suitable number of CD-RD ports 323 (e.g., one or more I/O ports) and any suitable number of LSDP-RD ports 329 (e.g., one or more 10 ports), Each LSDP may include a CD-LSDP port 383 (e.g., an I/O port) and a RD-LSDP port 389 (e.g., an I/O port). Each CD-RD port 323 of RD 321 may be associated with and coupled to a respective network interface module 305 of a respective network connection node 303 of a CD of system 301, Each LSDP-RD port 329 of RD 321 may be associated with and coupled to a RD-LSDP port 389 of a respective LSDP of BitSpooler 399 of system 301. A CD-LSDP port 383 of each LSDP of system 301 may be associated with and coupled to a respective network interface module 305 of a respective network connection node 303 of a CD of system 301. As shown in more detail in FIGS. 4, 5, and/or 6, an RD may be configured to communicatively couple a respective CD-RD port to a respective LSDP-RD port for forming an RD port pair, thereby enabling a BitSpooler (e.g., RD 321 and the one or more LSDPs of BitSpooler 399) to communicatively couple two associated network interface modules of two respective network connection nodes of a system (e.g., an interconnect between a first SFP of server A and an SFP of server X may be formed via RD 321 and LSDP 381$x$ and various associated media links, an interconnect between a second SFP of server A and an SFP of server Y may be formed via RD 321 and LSDP 381$y$ and various associated media links, and/or an interconnect between an SFP of server B and an SFP of server Z may be formed via RD 321 and LSDP 381$z$ and various associated media links), One or more CD-RD ports 323 of RD 321 may be directly coupled via a fixed or known or controlled CD-RD media link to a respective network interface module 305 of a respective network connection node 303 of system 301. For example, as shown in FIG. 3, a first CD-RD media link 309$rda$1 may be a fixed or known or controlled media link for directly coupling a network interface module 305 (e.g., SFP) of a first network connection node 303 of communication device 302 to a first CD-RD port 323 of RD 321, a second CD-RD media link 309$rda$2 may be a fixed or known or controlled media link for directly coupling a network interface module 305 (e.g., SFP) of a second network connection node 303 of communication device 302 to a second CD-RD port 323 of RD 321, and a third CD-RD media link 309$rdb$ may be a fixed or known or controlled media link for directly coupling a network interface module 305 (e.g., SFP) of a network connection node 303 of communication device 304 to a third CD-RD port 323 of RD 321. Each CD-RD media link may be a link of a fixed latency or of a negligible latency due to the proximity of RD 321 to communication devices 302 and 304 (e.g., when an RD of a BitSpooler is installed at one or more end user communication devices (e.g., when an RD is installed at the server(s) of a trading venue in a data center-hosted trading environment)). Each CD-RD media link associated with a BitSpooler may be a link assumed to be very short in length and/or a link with a very low or negligible latency. A user or operator of the system may be enabled to choose any suitable CD-RD media link. Such a link may not be directly rangeable by the BitSpooler (e.g., the BitSpooler may not be configured to send a ranging signal along the CD-RD media link to determine the latency of the link), such that a CD-RD media link may be referred to herein as an unrangeable link or a non-rangeable link of a system with one or more BitSpooiers. Therefore, the system may treat the latency of each CD-RD media link as zero or identical so as to be negligible for traffic shaping purposes. Alternatively, in some embodiments, a user may determine and define the length or latency of one, some, or each CD-RD media link and may provide the system (e.g., a processing module (e.g., processing module 312)) with such length or latency information such that the latency of one, some, or each CD-RD media link may be used as part of any suitable system latency and/or other suitable traffic shaping calculations.

The CD-LSDP port 383 of each LSDP of BitSpooler 399 may be directly coupled via a fixed or known or controlled CD-LSDP media link to a respective network interface module 305 of a respective network connection node 303 of system 301. For example, as shown in FIG. 3, a first CD-LSDP media link 309$lpx$ may be a fixed or known or controlled media link for directly coupling a network interface module 305 (e.g., SFP) of a network connection node 303 of communication device 306 to CD-LSDP port 383 of first LSDP 381$x$ of BitSpooler 399, a second. CD-LSDP media link 309$lpy$ may be a fixed or known or controlled media link for directly coupling a network interface module 305 (e.g., SFP) of a network connection node 303 of communication device 308 to CD-LSDP port 383 of second LSDP 381y of BitSpooler 399, and a third CD-LSDP media link 309$lpz$ may be a fixed or known or controlled media link for directly coupling a network interface module 305 (e.g., SFP) of a network connection node 303 of communication device 310 to CD-LSDP port 383 of third LSDP 381z of BitSpooler 399, Each CD-LSDP media link may be a link of a fixed latency or of a negligible latency due to the proximity of each LSDP to its respective communication device network interface module 305 (e.g., when an LSDP of a BitSpooler is installed at an end user communication device (e.g., when an LSDP is installed at a server of a respective market participant in a data center-hosted trading environment)). Each CD-LSDP media link associated with a Bit-Spooler may be a link assumed to be very short in length and/or a link with a very low or negligible latency. A user or operator of the system may be enabled to choose any suitable CD-LSDP media link. Such a link may not be directly rangeable by the BitSpooler (e.g., the BitSpooler may not be configured to send a ranging signal along the CD-LSDP media link to determine the latency of the link), such that a CD-LSDP media link may be referred to herein as an unrangeable link or a non-rangeable link of a system with one or more BitSpoolers. Therefore, the system may treat the latency of each CD-LSDP media link as zero or identical to one another so as to be negligible for traffic shaping purposes. Alternatively, in some embodiments, a user may determine and define the length or latency of one, some, or each CD-LSDP media link and may provide the system (e.g., a processing module (e.g., processing module 312)) with such length or latency information such that the latency of one, some, or each CD-LSDP media link may be used as part of any suitable system latency and/or other suitable traffic shaping calculations.

An LSDP-RD port 329 of RD 321 of BitSpooler 399 may be coupled to the RD-LSDP port 389 of a respective LSDP of BitSpooler 399 via a variable or adjustable or unknown or uncontrolled RD-LSDP media link of system 301. For example, as shown in FIG. 3, a first RD-LSDP media link 307*rdx* may be a variable or unknown or uncontrolled media link (e.g., a spool or amount of fiber-optic cable (e.g., spool 207*ax* of system 201)) for coupling a first LSDP-RD port 329 of RD 321 to the RD-LSDP port 389 of first LSDP 381*x* of BitSpooler 399 of system 301, a second RD-LSDP media link 307*rdy* may be a variable or adjustable or unknown or uncontrolled media link (e.g., a spool or amount of fiber-optic cable (e.g., spool 207*ay* of system 201)) for coupling a second LSDP-RD port 329 of RD 321 to the RD-LSDP port 389 of second LSDP 381*y* of BitSpooler 399 of system 301, and a third RD-LSDP media link 307*rdz* may be a variable or adjustable or unknown or uncontrolled media link (e.g., a spool or amount of fiber-optic cable (e.g., spool 207*bz* of system 201)) for coupling a third LSDP-RD port 329 of RD 321 to the RD-LSDP port 389 of third LSDP 381*z* of BitSpooler 399 of system 301. Each RD-LSDP media link may be a link of a variable or unknown or uncontrolled latency due to the variable or adjustable or unknown distance between end points of an interconnect of the communication network of system 301 (e.g., due to an unknown or variable distance between communication devices 302 and 306 (e.g., servers A and X), due to an unknown or variable distance between communication devices 302 and 308 (e.g., servers A and Y), due to an unknown or variable distance between communication devices 304 and 310 (e.g., servers B and Z), etc.) for any suitable environment or use case (e.g., when an RD of a BitSpooler is installed at a first end user communication device of an interconnect of a communication network (e.g., when an RD is installed at the server(s) of a trading venue in a data center-hosted trading environment) and when an LSDP of the BitSpooler is installed at a second end user communication device of the interconnect e.g., when an LSDP is installed at a server of a respective market participant in a data center-hosted trading environment)). Unlike each CD-RD media link and each CD-LSDP link, each RD-LSDP media link associated with a BitSpooler may be a link of some unknown length and/or a link with an unknown non-negligible latency. While a user or operator or any other entity may be enabled to choose any suitable RD-LSDP media link, such a RD-LSDP media link may be directly rangeable by the BitSpooler (e.g., the BitSpooler may be configured to send a ranging signal along the RD-LSDP media link to determine the latency of the link), such that a RD-LSDP media link may be referred to herein as a rangeable link of a system with one or more BitSpoolers. Therefore, the system may treat the latency of each RD-LSDP media link as determinable (e.g., periodically or at any given moment) by the system for traffic shaping purposes.

Therefore, as shown in FIG. 3, an interconnect between two user communication devices of system 301 (e.g., an interconnect between a network interface module 305 (e.g., SFP) of a network connection node 303 of a first communication device 302 or 304 and a network interface module 305 (e.g., SFP) of a network connection node 303 of a second communication device 306 or 308 or 310) may include a fixed or known or controlled CD-RD media link (e.g., one of CD-RD media links 309*rda*1, 309*rda*2, and 309*rdb*), RD 321 of BitSpooler 399, a variable or adjustable or unknown or uncontrolled RD-LSDP media link (e.g., one of RD-LSDP media links 307*rdx*, 307*rdy*, and 307*rdz*), an LSDP of BitSpooler 399 (e.g., one of LSDPs 381*x*, 381*y*, and 381*z*)and a fixed or known or controlled CD-LSDP media link (e.g., one of CD-LSDP media links 309*lpx*, 309*lpy*, and 309*lpz*). In a particular embodiment, as shown, the following three interconnects of the communication network of system 301 may be provided: (1) a first interconnect between a network interface module 305 (e.g., SFP) of a first network connection node 303 of communication device 302 and a network interface module 305 (e.g., SFP) of a network connection node 303 of communication device 306 (e.g., an interconnect between server A and server X) may include CD-RD media link 309*rda*1, a first RD interconnect channel 361-1 between a first CD-RD port 323 and a first LSDP-RD port 329 of RD 321 of BitSpooler 399 that may include a first user traffic channel 351-1 and a particular or shared ranging traffic channel 341, RD-LSDP media link 307*rdx*, LSDP 381*x* of BitSpooler 399, and CD-LSDP media link 309*lpx*; (2) a second interconnect between a network interface module 305 (e.g., SFP) of a second network connection node 303 of communication device 302 and a network interface module 305 (e.g., SFP) of a network connection node 303 of communication device 308 (e.g., an interconnect between server A and server Y) may include CD-RD media link 309*rda*2, a second RD interconnect channel 361-2 between a second CD-RD port 323 and a second LSDP-RD port 329 of RD 321 of BitSpooler 399 that may include a second user traffic channel 351-2 and a particular or shared ranging traffic channel 341, RD-LSDP media link 307*rdy*, LSDP 381*y* of BitSpooler 399, and CD-LSDP media link 309*lpy*; and (3) a third interconnect between a network interface module 305 (e.g., SFP) of a network connection node 303 of communication device 304 and a network interface module 305 (e.g., SFP) of a network connection node 303 of communication device 310 (e,g., an interconnect between server B and server Z) may include CD-RD media link 309*rdb*, a third RD interconnect channel 361-3 between a third CD-RD port 323 and a third LSDP-RD port 329 of RD 321 of BitSpooler 399 that may include a third user traffic channel 351-3 and a particular or shared ranging traffic channel 341, RD-LSDP media link 307*rdz*, LSDP 381*z* of BitSpooler 399, and CI)-LSDP media link 309*lpz*. As described herein, it is to be understood that data communicated over each one of the CD-RD media links and over each one of the CD-LSDP media links of system 301 of FIG. 3 may be end-user traffic, similar to data communicated over the CD-CD media links of system 201 of FIG. 2, such that the use of a BitSpooler need not affect the type of data communicated from and/or to an end user communication device, while data communicated over each one of the RD-LSDP media links of system 301 of FIG. 3 may be such end-user traffic and/or ranging traffic that may be unique to the BitSpooler (e.g., as may be generated by one or more ranging traffic channels 341 of the BitSpooler) and utilized by the BitSpooler to enable any suitable traffic shaping of the communication network system. ft is to be noted that, while FIG. 3 may show each one of such RD-LSDP media links 307*rdx*, 307*rdy*, and 307*rdz* as being within BitSpooler 399, a BitSpooler may be referred to herein as just including an RD and one or more LSDPs, while the RD-LSDP media links may not be considered a portion of the BitSpooler product but rather unknown and variable but rangeable media that may be provided for enabling the BitSpooler to function within a communication network.

A BitSpooler may include or otherwise work in conjunction with any suitable processing module that may be operative to receive detected link data from the BitSpooler regarding any one or more suitable media links of the system (e.g., based on any suitable ranging traffic characteristics, etc.) and to process such detected link data in order to generate any suitable control link data that may be operative to adjust any suitable characteristic(s) of any one or more suitable media links of the system. For example, as shown in FIG. 3, a processing module 312 may be used to run one or more applications, such as an application 319 that may be accessible from any suitable memory 313 (e.g., as a portion of data 319d) and/or any other suitable source (e.g., from any other device in its system), while processing module 312 may also be configured to receive any suitable detected link data from a detected link data output port 343 of BitSpooler 399 (e.g., from one or more ranging traffic channels of the BitSpooler) via any suitable detected link data communicative coupling 343c using any suitable communication protocol (e.g., 1G Cat 5 PHY cable and/or RJ45 connector and/or the like), and while processing module 312 may also be configured to transmit any suitable control link data to a control link data input port 353 of BitSpooler 399 (e.g., to one or more user traffic channels of the BitSpooler) via any suitable control link data communicative coupling 353c using any suitable communication protocol (e.g., 1G Cat 5 PHY cable and/or RJ45 connector and/or the like). For example, processing module 312 may load any suitable application 319 as an interface program to determine how instructions or data received (e.g., any suitable detected link data from a detected link data output port of one or more BitSpoolers) may manipulate the way in which information may be stored (e.g., in memory 313) and/or transmitted to any suitable system device (e.g., any suitable control link data to a control link data input port of one or more BitSpoolers). It is to be understood that, although processing module 312 may be shown in FIG. 3 to be distinct and remote from BitSpooler 399, such a processing module may alternatively be provided on or by BitSpooler 399 itself.

A ranging device may be implemented using any suitable computing device(s) or circuitry (e.g., computing device 339 of an RD of FIG. 4), including, but not limited to, a field-programmable gate array ("FPGA"), central processing unit ("CPU"), graphics processing unit ("GPU"), application-specific integrated circuit ("ASIC"), micro-controller, and/or any multiple or combinations thereof. Additionally, an RD may include any other suitable components, including, but not limited to, one or more network interface modules (e.g., module 325 of an RD of FIG. 4), such as SFPs or other suitable transceivers that may be operative to carry out any suitable bi-directional electrical to optical translation or other suitable translation at any suitable speed (e.g., 10 gigabits/second, 25 gigabits/second, 50 gigabits/second, 100 gigabits/second, etc.), one or more fiber optic or optical couplers (e.g., coupler 365 of an RD of FIG. 4) or wavelength sensitive couplers (e.g., that may be used as optical splitters/combiners or optical multiplexers/demultiplexers or optical add-drop multiplexers in wavelength-division multiplexing ("WDM") for enabling the combination of several input channels with different wavelengths or the separation of channels or the like), and/or the like. It is to be understood that any component or circuitry or module or the like that is described herein as being bidirectional may instead be provided by a combination of entities, some of which may be unidirectional, in order to provide bidirectionality in an alternative manner. An RD may be configured to have any suitable functionalities, including, but not limited to, calculating (e.g., ranging) the native delay between the RD and an LSDP of the BitSpooler (e.g., native delay of any variable or adjustable or unknown or uncontrolled RD-LSDP media link (e,g., one of RD-ISDP media links 307rdx, 307rdy, and 307rdz of BitSpooler 301)), programmatically adjusting the delay between the RD and an LSDP of the BitSpooler based on any suitable data (e.g., in accordance with any suitable policies (e.g., user-defined policies) on a per-link basis) or otherwise deterministically and/or dynamically shaping traffic of the communication network, and monitoring the health of the communication network based on any suitable data (e.g., in accordance with any suitable policies (e.g., user-defined policies) on a per-link basis), such as determining if a link becomes significantly slower than usual or is cut-off or not useful and then reporting such a determination immediately to an operator or other entity with an interest in the network (e.g., via an I/O component of the processing module or otherwise), An RD (e.g., with any suitable on-RD processing or in combination with any other suitable processing (e.g., with processing module 312)) may be configured to calculate or range a native delay of one, some, or each variable or adjustable or unknown or uncontrolled RD-LSDP media link continuously and constantly (e,g., at any suitable frequency (e.g., each link every millisecond or every second or any other suitable frequency) and also to adjust one or more of the delays provided by one or more of such links for user traffic continuously and constantly based on such calculations. For example, an RD's ranging traffic channel may include any suitable latency calculator circuitry that may be configured to determine a latency or native delay of one, some, or each user traffic channel between the RD and one, some, or each LSDP, and the processing module may be operative to receive the determined latencies of all channels to calculate what delay to add to one, some, or each channel for effecting a certain result and then such data indicative of each delay may be transmitted to each appropriate user traffic channel of the RD and the user traffic channel of the RD may use such delay data to adjust the latency of that, user traffic channel (e.g., by adjusting a memory or buffer of that channel). Ranging of one or more links may be carried out using any suitable technology, including, but not limited to, passive ranging (e.g., on a single fiber) using an optical switch (see, e.g., FIG. 5), a tunable network interface module or tunable SFP (see, e.g., FIG. 6), and/or the like, or active ranging using Internet protocol ("IP") based techniques (e.g., sending packets at layer 3 and/or up in the IP suite (e.g., for WAN communication networks, etc.)), and/or the like.

Figure 4:
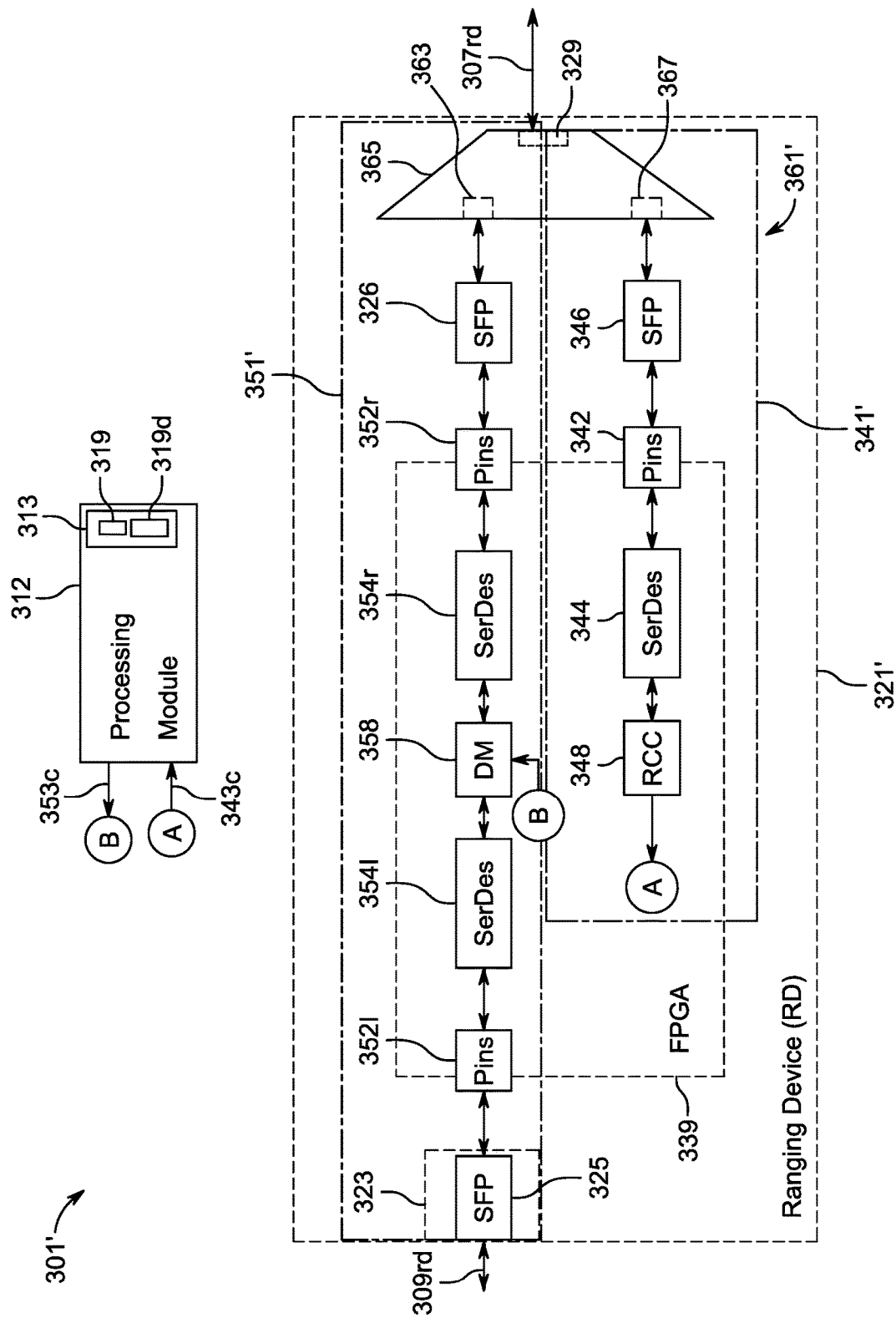
FIG. 4 is a schematic diagram illustrating another portion of a communication network including a deterministic dynamic traffic shaping engine, according to some embodiments of the disclosure.

FIG. 4 shows a portion of an exemplary communication network system 301', which may be the same as or substantially similar to system 301 of FIG. 3, except as otherwise noted. The portion of system 301' of FIG. 4 may include an exemplary RD 321' that may include an exemplary RD interconnect channel 361' between a CD-RD port 323 (e.g., as may be coupled to any suitable CD-RD media link 309rd) and a LSDP-RD port 329 (e.g., as may be coupled to any suitable RD-LSDP media link 307rd). As shown, RD interconnect channel 361' may include an exemplary user traffic channel 351' and an exemplary ranging traffic channel 341'. Any suitable interface module 325 (e.g., SEP) may be provided by RD 321' at CD-RD port 323 for translating any optical data received by RD 321' at CD-RD media link 309rd into electrical data for use by user traffic channel 351' and/or for translating any electrical data provided by user traffic channel 351' into optical data for transmission onto CD-RD media link 309rd. RD 321' may include any suitable optical coupler 365, such as an optical multiplexer (e.g., a 2-to-1multiplexer and a 1-to-2 demultiplexer), where LSDP-RD port 329 of RD 321' may be provided by the "combined" port of optical coupler 365, a first "separated" port 363 of the two separated ports of optical coupler 365 may be associated with user traffic channel 351', and a second "separated" port 367 of the two separated ports of optical coupler 365 may be associated with ranging traffic channel 341'.

Any suitable interface module 326 (e.g., SFP) may be provided by RD 321' at first separated optical port 363 for translating any optical data received by first separated optical port 363 from LSDP-RD port 329 and RD-LSDP media link 307rd. into electrical data for use by user traffic channel 351' and/or for translating any electrical data provided by user traffic channel 351' into optical data for transmission by first separated optical port 363 onto LSDP-RD port 329 and RD-LSDP media link 307rd. Between interface module 325 and interface module 326, user traffic channel 351' may include any suitable components for handling the translated electrical data. For example, as shown, user traffic channel 351' may include a first pin set 352l, a first serializer/deserializer ("SerDes") 354l, a delay module ("DM") 358, a second SerDes 354r, and a second pin set 352r, all of which may be provided on any suitable computing device 339 of RD 321' (e.g., an FPGA), whereas interface modules 325 and 326 and optical coupler 365 and any intervening (e.g., minimal) optical fibers may be off of computing device 339 (e.g., on a circuit board or not) depending on the physical structure of the RD to be manufactured. Each one of pin sets 352l and 352r may include two pairs of differential pins (e.g., one pair for each direction in which the data may be communicated via the pin set) for handling the electrical data (e.g., for enabling low voltage differential signaling ("LVDS")). Each one of SerDes 354l and 354r may serialize electrical data from a differential pin pair or deserialize electrical data for a differential pin pair (e.g., depending on which of the two directions data may be communicated via the SerDes). DM 358 may be any suitable circuitry that may be operative to add any suitable delay or latency to the electrical data being communicated therethrough, such as an adjustable buffer or a memory feature that may hold and delay the data for a particular amount of clock cycles or any other suitable delay amount, which may be dictated by any suitable control link data that may be received at DM 358 via a control link data input port of RD 321' via any suitable control link data communicative coupling 353c using any suitable communication protocol from any suitable processing module 312 of system 301'. Such data buffering within a user traffic channel of an RD may be accomplished via memory that may be internal to the RD or internal to the user traffic channel circuitry (e.g., memory of a DM on a computing device of an RD (see, e.g., DM 358-1 on computing device 339 of FIG. 8)) and/or via memory that may be external to the RD or external to the user traffic channel circuitry (see, e.g., external memory 339em off of computing device 339 of FIG. 8). For example, in the case of an FPGA computing device, the internal memory can be a combination of distributed and block memory, and may be used for adding relatively short delays (e.g., on the order of milliseconds). External memory may typically be either static random-access memory ("SRAM") or dynamic random-access memory ("DRAM") and may be used for adding longer delays (e.g., greater than millisecond delays). As one example, a delay module may include a dual-port memory, and two pointers (e.g., read pointer and a write pointer). Any suitable logic associated with the RD (e.g., logic in the FPGA) can be used to maintain a difference between the two pointers, thereby maintaining a specified delay (e. ., a certain number of clock periods), such as with a first-in-first-out ("FIFO") buffer (e.g,, a read/write memory array). As another example, although not shown, delay of one or more paths could be controlled by the RD using optical delay lines rather than in the electrical domain.

Any suitable interface module 346 (e.g., SFP) may be provided by RD 321' at second separated optical port 367 for translating any optical data received by second separated optical port 367 from LSDP-RD port 329 and RD-LSDP media link 307rd into electrical data for use by ranging traffic channel 341' and/or for translating any electrical data provided by ranging traffic channel 341' into optical data for transmission by second separated optical port 367 onto LSDP-RD port 329 and RD-LSDP media link 307rd. Ranging traffic channel 341' may include any suitable components for handling the translated electrical data. For example, as shown, ranging traffic channel 341' may include a pin set 342, a SerDes 344, and a ranging channel calculator ("RCC") 348, all of which may be provided on any suitable computing device 339 of RD 321' (e.g., an FPGA), whereas interface module 346 and optical coupler 365 may be off of computing device 339 (e.g., on a circuit board or not) depending on the physical structure of the RD to be manufactured. Pin set 342 may include two pairs of differential pins (e.g., one pair for each direction in which the data may be communicated via the pin set) for handling the electrical data (e.g., for enabling low voltage differential signaling ("LVDS")). SerDes 344 may serialize electrical data from a differential pin pair or deserialize electrical data for a differential pin pair (e.g., depending on which of the two directions data may be communicated via the SerDes). RCC 348 may be any suitable circuitry that may be operative to determine the native delay between the RD and an LSDP associated with the RD interconnect channel 361' including ranging traffic channel 341' (e.g., native delay of RD-LSDP media link 307rd) and communicate such a calculated native delay as any suitable detected link data through a detected link data output port of RD 321' to any suitable processing module 312 of system 301' via any suitable control link data communicative coupling 343c using any suitable communication protocol.

Figure 7:
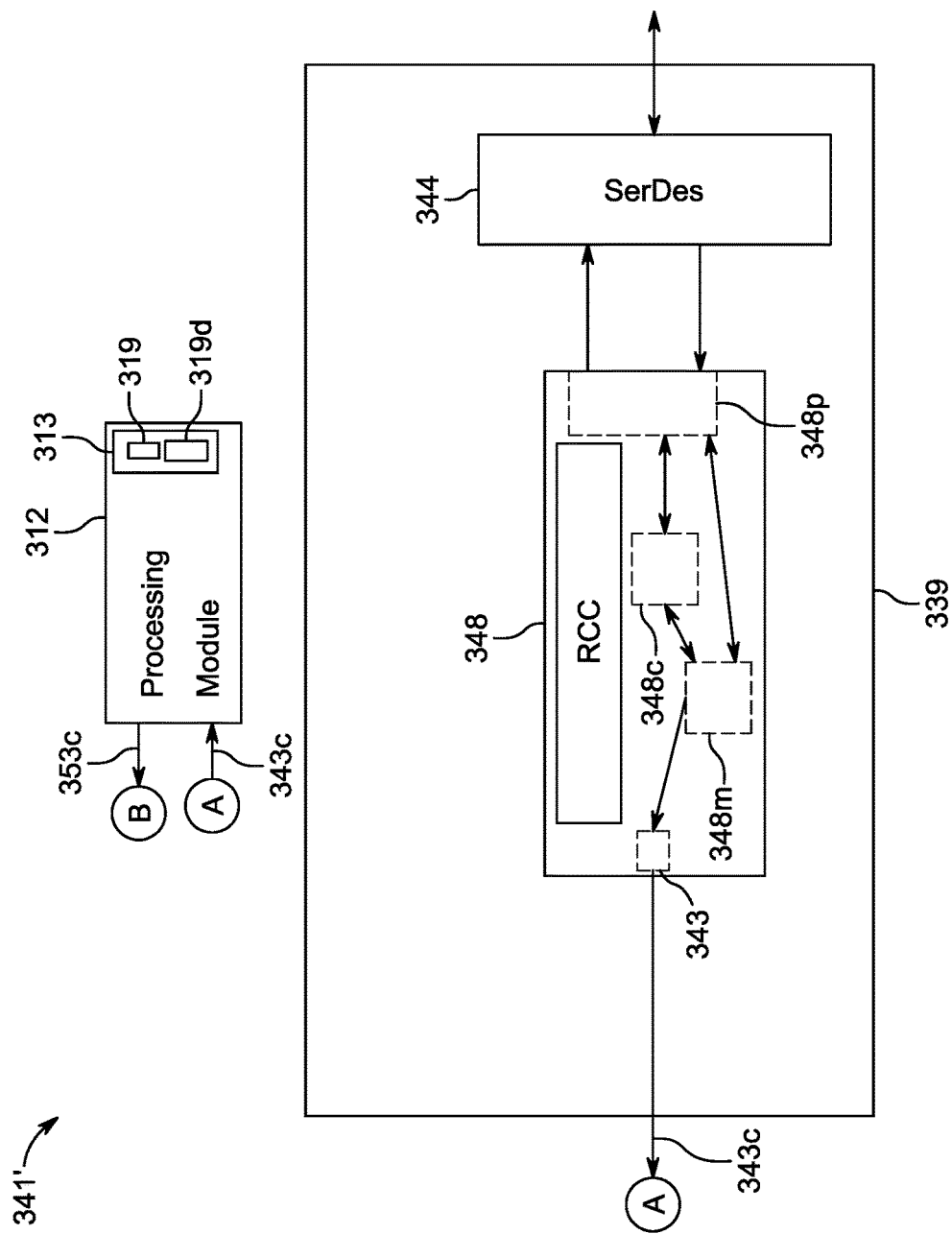
FIG. 7 is a schematic diagram illustrating another portion of a communication network including a deterministic dynamic traffic shaping engine, according to some embodiments of the disclosure.

An RCC of an RD may be configured to operate as a stop watch that may be started when a ranging signal generated by the RD is transmitted from the RCC for communication over the remainder of the ranging traffic channel of the RD and then along its associated RD-LSDP media link and that may be stopped when that same transmitted ranging signal is received by the RCC after being returned back over the RD-LSDP media link and then through the ranging traffic channel of the RD by the LSDP at the end of the RD-LSDP media link, whereby the amount of time measured by such a stop watch may be indicative of the native delay of the roundtrip communication path between the RD and the LSDP at either ends of the RD-LSDP media link. For example, as shown by a portion of ranging traffic channel 341' in FIG. 7, RCC 348 may include any suitable components, including, but not limited to, any suitable processing component 348p, any suitable counter component 348c, and/or any suitable memory component 348m, although any other suitable configuration may be possible. Processing component 348p may be configured to generate or otherwise access a ranging signal and transmit that ranging signal along ranging traffic channel 341' (e.g., to SerDes 344 for transmission through pin set 342 and interface module 346 and ports 367 and 329 of optical coupler 365) and onto RD-LSDP media link 307rd, Processing component 348p may also be configured to reset or initialize or otherwise start a counter of counter component 348c when the ranging signal is transmitted out along ranging traffic channel 341' and then to record the value of the counter of counter component 348c (e.g., in memory component 348m) when that same ranging signal is received back by processing component 348p. A product of a clock period of the counter component and the recorded counter value associated with the round trip travel of the ranging signal from RCC 348 to the LSDP at the opposite end of RD-LSDP media link 307rd and back to RCC 348 may be indicative of the round trip travel time and, thus, the native delay of the roundtrip communication path between the RD and the LSDP at opposite ends of the RD-LSDP media link associated with the subject ranging signal, whereby such measured delay or latency may be indicative of the length of the RD-LSDP media link. Therefore, this ranging procedure or process of an RCC may use a counter operated by a clock with a known frequency (e.g., a clock accessible to computing device 339 of RD 321' (e.g., an FPGA)). Such a calculated travel time and/or the raw recorded counter value may then be made accessible to processing module 312 for any suitable handling (e.g., to process the raw recorded counter value to determine the travel time, to utilize the calculated travel time of the associated RD-LSDP media link of the associated RD interconnect channel to determine what suitable control link data may be generated and transmitted for adjusting one or more user traffic channels of the communication network system, etc.). RCC 348 of RD 321' may repeat such a ranging procedure of transmitting and later receiving a ranging signal for enabling determination of a latency of RD-LDSP media link 307*rd* at any suitable interval or frequency (e.g., once every second or once every millisecond or any other suitable frequency) or in response to any suitable command (e,g., from any suitable controller or processing component of system 301' (e.g., processing module 312 or otherwise). A time-out feature may be utilized by such a ranging procedure, whereby if a transmitted ranging signal is not received back by the RCC before a particular amount of time (e.g., 0.01 milliseconds or any other suitable duration) has expired (e.g., before the counter reaches a certain value), then the ranging procedure associated with that transmitted ranging signal may be timed out and data indicative of such a time-out may be recorded (e.g., in memory component 348*m*) before moving on to another iteration of the ranging procedure, where such a time-out result may be utilized to determine that the RD-LSDP media link associated with the timed-cut ranging procedure has been damaged or disconnected or otherwise compromised.

A ranging signal that may be utilized by such a ranging procedure of an RCC may be any suitable signal that may be adequately communicated along the RCC's ranging traffic channel and associated RD-LSDP media link and back again via an LSDP coupled to the RD-LSDP. The ranging signal may include or represent a pattern that may be recognized by the RCC when the ranging signal is received back at the RCC. For example, such a ranging signal may be or include, but is not limited to, a single pulse (e.g., a signal that may have reduced or minimized possible jitter and that may be protocol agnostic above the Layer 1 (e.g., Physical Layer) but that may not enable much additional information to be gleaned from its handling besides native latency of the link), a pseudo-random sequence (e.g., a signal that may enable an ability of the system to extract additional information about the state of the link beyond native latency (e.g., bit error rate may be determined based on how well the transmitted sequence is received (e.g., a bit error rate for the received vs. transmitted ranging signal may be compared to a minimum error rate threshold and if exceeded may result in an alarm being triggered for use by an operator to further inspect the link) or a power loss may be determined based on how much of the power associated with the transmitted sequence is received (e.g., a power loss rate for the received vs. transmitted ranging signal may be compared to a minimum power loss rate threshold and if exceeded may result in an alarm being triggered for use by an operator to further inspect the link), and/or the like), although such a sequence may potentially result in more jitter relative to a single pulse), a signal according to a proprietary protocol (e.g., a signal that may enable an ability of the system to extract even more additional information about the state of the link beyond native latency (e.g., using digital signal processing ("DSP")), although such a signal may potentially result in more jitter relative to a signal with a pseudo-random sequence), an Ethernet frame (e.g., a signal that may enable an ability of the system to extract even more additional information about the state of the link beyond native latency (e.g., using ethernet protocol, which may allow for the use of the inter-frame gap ("IFG") to derive information about slight clock differences, etc.) and/or that may potentially provide a greater ability to integrate into an existing system, although such a signal may require implementation of an Ethernet media access controller ("MAC") and/or may potentially result in more jitter relative to a signal with a proprietary protocol), and/or a Layer 3 packet (e.g., a signal that may allow for the presence of intermediate equipment in the link being measured (e.g., network switches and/or routers), although such a. signal may potentially result in more measurement jitter relative to other signal types). in some embodiments, the system may be configured to ensure that any ranging signal of any ranging traffic data of any ranging traffic channel of an RD interconnect channel may be communicated out from the RD at a different wavelength and/or frequency than that of any end user traffic data of any end user traffic channel of that same RD interconnect channel (e.g., such that an associated LSDP may be enabled to split or filter or otherwise distinguish between the different types of traffic data that may be communicated to the LSDP from the RD via an RD-LSDP media link).

Figure 9:
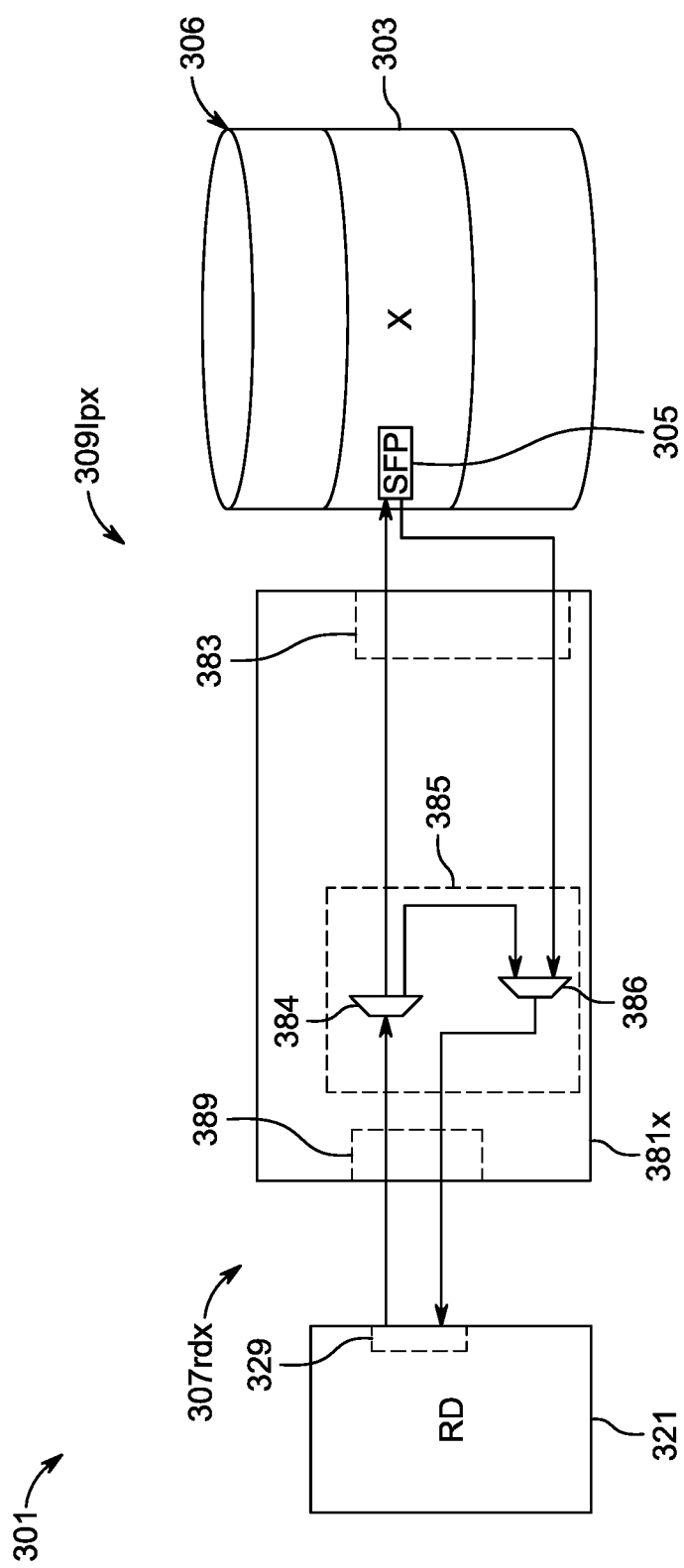
FIG. 9 is a schematic diagram illustrating another portion of a communication network including a deterministic dynamic traffic shaping engine, according to some embodiments of the disclosure.

An LSDP may be configured to enable the receipt and return of a ranging signal (e.g., ranging traffic) to an RD via an associated RD-LSDP media link (e.g., as looped back ranging traffic) while also enabling any end-user traffic to be passed through the LSDP for receipt by an end user device. An LSDP may include any suitable optical coupler that may allow the establishment of a latency standardization demarcation point. Depending on the type of multiplexing and/or other mechanisms used at an associated RD, the LDSP implementations may differ from each other in one or more ways. However, generally, as shown in FIG. 9, an LSDP, such as LSDP 381*x* of system 301, may include an optical coupler 385 that may be positioned between the LSDP's CD-LSDP port 383 and the LSDP's RD-LSDP port 389 for enabling and restricting the flow of various types of traffic therebetween. As described herein, it is to be understood that data communicated over each one of the CD-RD media links and over each one of the CD-LSDP media links of system 301 (e.g., CD-LSDP media link(s) 309*lpx* of FIG. 9) may be end-user traffic, similar to data communicated over the CD-CD media links of system 201, such that, the use of a BitSpooler need not affect the type of data communicated from and/or to an end user communication device (e.g., communication device 306 of FIG. 9), while data communicated over each one of the RD-LSDP media links of system 301 (e.g., RD-LSDP media link( )307*rdx* of FIG. 9) may be such end-user traffic and/or ranging traffic that may be unique to the BitSpooler (e.g., a ranging signal as may be generated by an RCC of one or more ranging traffic channels 341 of the RD) and utilized by the BitSpooler to enable any suitable traffic shaping of the communication network system. Therefore, an optical coupler of an LSDP may be configured to (1) split any incoming data (e.g., light or optical data) received from an RD via an IW-LSDP media link at the LSDP's RD-LSDP port into two or more paths based on differing frequencies or wavelengths of the received incoming data so as to separate any end user traffic data from any ranging traffic data (e.g., any end user traffic data may be provided at one or more standard wavelengths (e.g., 1310 nanometers) while any ranging traffic data may be provided. with the system at any other separate wavelength (e.g., 1610 nanometers) that may be filtered or split by the optical coupler), (2) pass any such split end user traffic data out from the LSDP via the LSDP's CD-LSDP port in order for such end user traffic data to be received by the target end user communication device, (3) combine any such split ranging traffic data with any end user traffic data received by the optical coupler from the LSDP's CD-LSDP port, and (4) pass any such combined traffic data out from the LSDP via the LSDP's RD-LSDP port in order for such combined traffic data to be received by the RD. Particularly, in some embodiments, as shown in FIG. 9, optical coupler 385 of LSDP 381x may include any suitable optical splitter 384 and any suitable optical combiner 386. Optical splitter 384 may be configured to (1) split any incoming data (e.g., light or optical data) received from RD 321 via RD-LSDP link 307rdx at RD-LSDP port 389 of LSDP 381x into two or more paths based on differing frequencies or wavelengths of the received incoming data so as to separate any end user traffic data from any ranging traffic data (e.g., filter out any ranging traffic data that may be at a particular ranging wavelength of the system (e.g., 1610 nanometers) that may be different than any wavelength(s) at which any user data traffic may be communicated through the system), (2) pass any such split end user traffic data out from LSDP 381x via CD-LSDP port 383 and onto CD-LSDP media link 309lpx in order for such end user traffic data to be received by target end user communication device 306, and. (3) pass any such split ranging traffic data to optical combiner 386. Optical combiner 386 may he configured to (1) combine any such split ranging traffic data from optical splitter 384 with any end user traffic data received by optical combiner 386 from CD-LSDP port 383 (e.g., end user traffic data communicated from end user communication device 306 to LSDP 381x via CD-LSDP media link 309lpx), and (2) pass any such combined traffic data out from LSDP 381x via RD-LSDP port 389 and onto RD-LSDP media link 307rdx in order for such combined traffic data to be received by RD 321. This may establish a round trip route between an RD and LSDP for any particular ranging signal, which may enable the RD (e.g., the RD's RCC) to determine the time it takes for a ranging signal (e.g., data packet or otherwise as ranging traffic data) to exit an RD and return to the RD after traveling along a full length of a variable RD-LSDP media link twice (e.g., along one length to the LSDP and the same length again back to the RD), where such a duration should be about twice the amount of time any traffic data (e.g., end user data) may take to travel from the RD to the LSDP and, thus, to a proximate end user device. Therefore, for any LSDP coupled between an RD and an end user communication device, any end user traffic data received by the LSDP from the RD may not be returned by the LSDP to the RD, but instead such end user traffic data may be passed on (e.g., transparently) by the LSDP to the target end user communication device, while any ranging traffic data received by the LSDP from the RD may be returned by the LSDP to the RD in combination with any end user traffic data that may have been received by the LSDP from the end user communication device. It is to be understood that any reference to combined traffic data may include a combination of ranging traffic data and end user tragic data, or only ranging traffic data, or only end user traffic data, depending on what type of data may be flowing through the LSDP during a particular situation.

Therefore, as shown in FIG. 4, RD interconnect channel 361' may include a user traffic channel 351' and a ranging traffic channel 341' that is utilized only with user traffic channel 351' (e.g., any optical data provided by ranging traffic channel 341' may be communicated through LSDP-RD port 329 and onto RD-LSDP media link 307rd, which may be also utilized by user traffic channel 351'). Although not shown in FIG. 4, another RD interconnect channel of RD 321' may include another ranging traffic channel that is utilized in a 1-to-1 manner with another user traffic channel (e.g., RD interconnect channel 361-1 of RD 321 of FIG. 3 may include user traffic channel 361-1 and a first ranging traffic channel (e.g., a first distinct channel of element 341 of FIG. 3) that may be similar to ranging traffic channel 341', RD interconnect channel 361-2 of RD 321 of FIG. 3 may include user traffic channel 361-2 and a second ranging traffic channel (e.g., a second distinct channel of element 341 of FIG. 3) that may be similar to ranging traffic channel 341' of FIG. 4, and RD interconnect channel 361-3 of RD 321 of FIG. 3 may include user traffic channel 361-3 and a third ranging traffic channel (e.g., a third distinct channel of element 341 of FIG. 3) that may be similar to ranging traffic channel 341' of FIG. 4).

The communication network system may not require any changes to the end-user equipment (e.g., end user communication devices, such as devices 302, 304, 306, 308, and 310, and/or end user media links, such as RD-LSDP media links 307rd (e.g., links 307rdx, 307rdy, and 307rdz)), such that any end user traffic data and any ranging traffic data of the system may be transmitted on a single, existing fiber. As described, this may be accomplished through the use of WDM, where one solution may be to include a multiplexer/demultiplexer for each link, thereby possibly using twice the number of SerDes. However, a configuration of a ranging traffic channel that may be provided for use in conjunction with only one associated user traffic channel (see, e.g., RD interconnect channel 361 of FIG. 4) may not be necessary or efficient in all situations and may be wasteful. Instead, a single ranging traffic channel (e.g., a single RCC) may be utilized with two or more distinct user traffic channels and, thus, two or more RD interconnect channels, which may reduce the amount of RD circuitry (e.g., reduce the number of SerDes and/or SFP's of the RD). For example, for an RD with three distinct user traffic channels (e.g., RD 321 with user traffic channels 351-1, 351-2, and 351-3), while some RD embodiments may include three distinct ranging traffic channels for supporting the three distinct user traffic channels three distinct versions of the ranging traffic channel 341' and user traffic channel 351' combination of FIG. 4), other RD embodiments may instead support those three distinct user traffic channels with a single ranging traffic channel, For example, it is possible support multiple user traffic channels by utilizing a single ranging traffic channel that may be configured to use a 1:N optical switch for ranging the multiple RD interconnect channels of the multiple user traffic channels one after the other in a round-robin fashion, or by utilizing a single ranging traffic channel that may be configured to use a tunable SEP and a passive wavelength division multiplexer for using different frequencies for ranging the multiple RD interconnect channels of the multiple user traffic channels.

Figure 5:
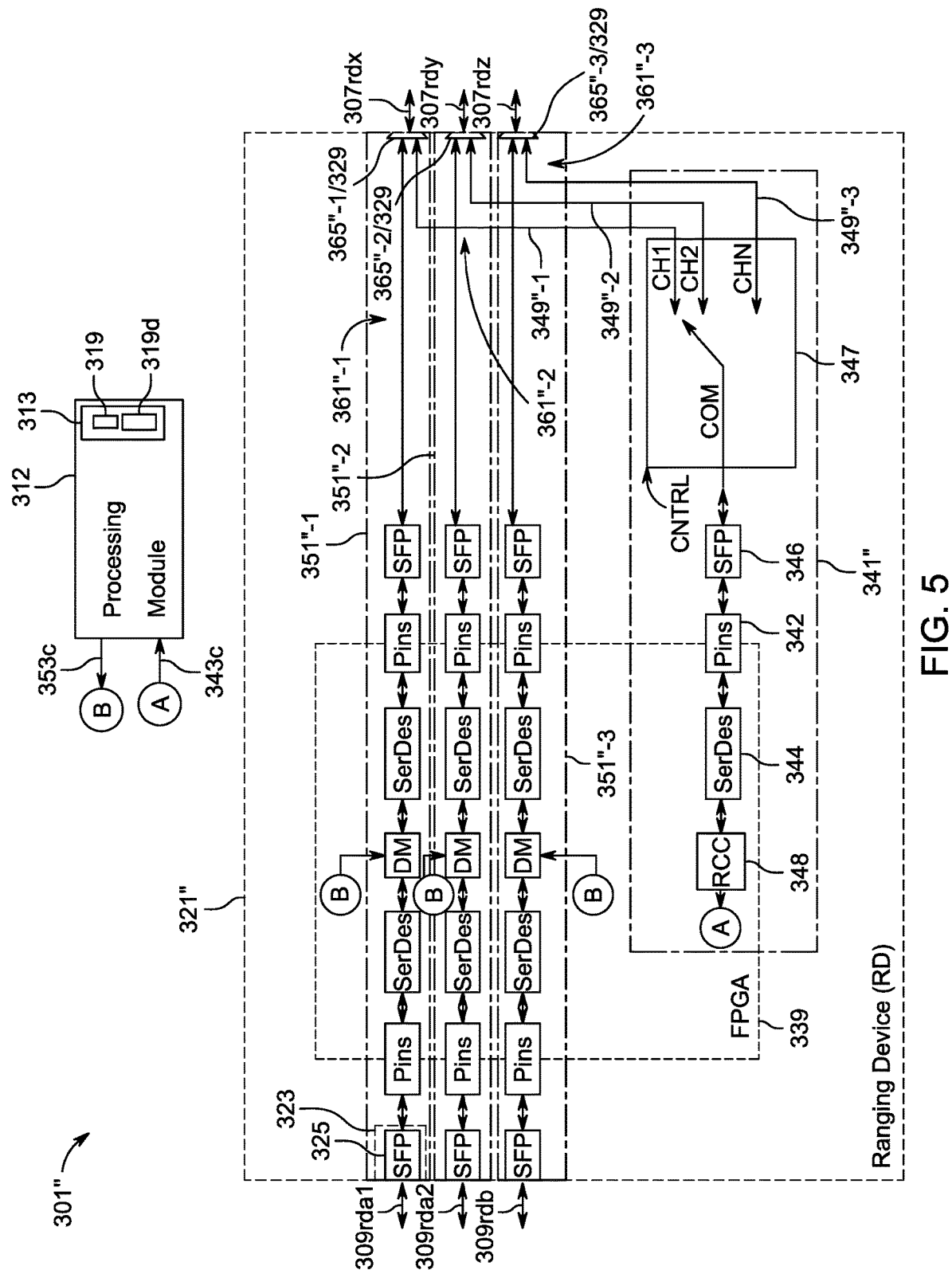
FIG. 5 is a schematic diagram illustrating another portion of a communication network including a deterministic dynamic traffic shaping engine, according to some embodiments of the disclosure.

FIG. 5 shows a portion of an exemplary communication network system 301", which may be the same as or substantially similar to system 301 of FIG. 3, except as otherwise noted, for providing an RD with multiple user traffic channels that may be utilized with a single ranging traffic channel. The portion of system 301" of FIG. 5 may include an exemplary RD 321" that may include (1) an exemplary first RD interconnect channel 361"-1 with an exemplary first user traffic channel 351"-1 between a first CD-RD port 323 (e.g., as may be coupled to CD-RD media link 309rda1) and a first LSDP-RD port 329 of a first optical coupler 365"-1 (e.g., as may be coupled to RD-LSDP media link 307rdx), (2) an exemplary second RD interconnect channel 361"-2 with an exemplary second user traffic channel 351"-2 between a second CD-RD port 323 (e.g., as may be coupled to CD-RD media link 309rda2) and a second LSDP-RD port 329 of a second optical coupler 365"-2 (e.g., as may be coupled to RD-LSDP media link 307rdy), (3) an exemplary third RD interconnect channel 361"-3 with an exemplary third user traffic channel 351"-3 between a third CD-RD port 323 (e.g., as may be coupled to CD-RD media link 309rdb) and a third LSDP-RD port 329 of a third optical coupler 365"-3 (e.g., as may be coupled to RD-LSDP media link 307rdz), and (4) a ranging traffic channel 341" that may be shared by each one of RD interconnect channels 361"-1, 361"-2, and 361"-3. As shown, in some embodiments, each one of user traffic channels 351"-1, 351"-2, and 351"-3 of FIG. 5 may be the same as user traffic channel 351' of FIG. 4, where any suitable interface module 325 (e.g., SFP) may be provided by each user traffic channel of RD 321" at the user traffic channel's CD-RD port 32.3 for translating any optical data received by RD 321" at a particular CD-RD media link 309rd into electrical data for use by the user traffic channel and/or for translating any electrical data provided by the user traffic channel into optical data for transmission onto the particular CD-RD media link 309rd. Each one of user traffic channels 351"-1, 351"-2, and 351"-3 of RD 321" may also include any suitable pin sets, SerDes, additional interface module (e.g., SEP), and DM component(s) (e.g., as described with respect to user traffic channel 351' of FIG. 4). As described with respect to DM component 358 of RD 321', each DM component of each one of user traffic channels 351"-1, 351"-2, and 351"-3 of RD 321" may be operative to add any suitable delay or latency to the electrical data being communicated therethrough. Such delay of each DM may be dictated independently from that of each of the other DMs of the other user traffic channels of RD 321" by any suitable control link data that may be received at the DM via a control link data input port via any suitable control link data communicative coupling 353c using any suitable communication protocol from any suitable processing module 312 of system 301". Each one of user traffic channels 351"-1, 351"-2, and 351"-3 of RD 321" may also include an optical coupler 365" (e.g., a respective one of couplers 365"-1, 365"-2, and 365"-3), such as an optical multiplexer (e.g., a 2-to-1 multiplexer and a 1-to-2 demultiplexer), where an. LSDP-RD port 329 of each user traffic channel of RD 321" may be provided by the "combined" port of a respective optical coupler 365", and where each optical coupler 365" of RD 321" may also include a first "separated" port (e.g., port 363 of coupler 365 of FIG. 4) of the two separated ports of the coupler and may be associated with the coupler's associated user traffic channel 351", and a second "separated" port (e.g., port 367 of coupler 365 of FIG. 4) of the two separated ports of the coupler and may be associated with shared ranging traffic channel 341". As described with respect to interface module or SFP 326 of RD 321', each additional or right side SFP component of each one of user traffic channels 351"-1, 351"-2, and 351"-3 of RD 321" may be provided by RD 321" at a first separated optical port of the particular channel's coupler 365" for translating any optical data received by that first separated optical port from the LSDP-RD port 329 of the particular channel's coupler 365" and associated RD-LSDP media link 307rd into electrical data for use by the particular user traffic channel 351" and/or for translating any electrical data provided by the particular user traffic channel 351" into optical data for transmission by the first separated optical port of the particular channel's coupler 365" onto LSDP-RD port 329 of the particular channel's coupler 365" and associated RD-LSDP media link 307rd.

As shown, like ranging traffic channel 341' of RD 321' of FIG. 4, ranging traffic channel 341" of RD 321" of FIG. 5 may include an RCC 348, SerDes 344, pin set 342, and any suitable interface module 346 (e.g., SEP). However, unlike in ranging traffic channel 341' of RD 321' of FIG. 4 where its interface module 346 (e.g., SFP) may be provided at second separated optical port 367 of coupler 365 for translating any optical data received by second separated optical port 367 from the coupler's LSDP-RD port 329 and RD-LSDP media link 307rd into electrical data for use by ranging traffic channel 341' and/or for translating any electrical data provided by ranging traffic channel 341' into optical data for transmission by second separated optical port 367 of coupler 365 onto the coupler's LSDP-RD port 329 and RD-LSDP media link 307rd, such an interface module 346 of ranging traffic channel 341" of RD 321" of FIG. 5 may be coupled to the second separated optical port of each one of the RD interconnect channel couplers 365"-1, 365"-2, and 365"-3 via any suitable optical switch 347. As shown, optical switch 347 may be any suitable switch that may be operative to communicatively couple interface module 346 of ranging traffic channel 341" selectively to one of N LSDP communication paths 349", such as selectively to one of (1) a first LSDP communication path 349"-1 that may communicatively couple switch 347 (and, thus, selectively SEP 346) to the second separated optical port of coupler 365"-1 of first RD interconnect channel 361"-1 (e.g., when ranging traffic channel 341" is to be utilized with first user traffic channel 351"-1), (2) a second. LSDP communication path 349"-2 that may communicatively couple switch 347 (and, thus, selectively SFP 346) to the second separated optical port of coupler 365"-2 of second RD interconnect channel 361"-2 (e.g., when ranging traffic channel 341" is to be utilized with second user traffic channel 351"-2), and (3) a third LSDP communication path 349"-3 that may communicatively couple switch 347 (and, thus, selectively SFP 346) to the second separated optical port of coupler 365"-3 of third RD interconnect channel 361"-3 (e.g., when ranging traffic channel 341" is to be utilized with third user traffic channel 351"-3). Any suitable control signal CNTRL may be utilized to select which one of the available LSDP communication paths 349" is to be communicatively coupled to interface module 346 of ranging traffic channel 341" at any given time. For example, control signal CNTRL may be controlled by processing component 348m of RCC 348 or any other suitable processing component or controller of any suitable computing device 339 of RD 321" (e.g., an FPGA) and/or processing module 312 of system 301". In other embodiments, although not shown, switch 347 may be an electrical switch operating in the electrical domain if positioned to the left of interface module 346 in FIG. 5, but may utilize a distinct module 346 at each channel output of the switch.

Like ranging traffic channel 341' of RD 321' of FIG. 4, ranging traffic channel 341" of RD 321" of FIG. 5 may utilize RCC 348 to carry out a ranging procedure of transmitting and later receiving a ranging signal for enabling determination of a latency of an RD-LDSP media link 307*rd* communicatively coupled to RCC 348. However, unlike RCC 348 of ranging traffic channel 341' of RD 321' of FIG. 4 that may be used for determining the latency of just one RD-LDSP media link 307*rd* communicatively coupled to just one user traffic channel 351', RCC 348 of ranging traffic channel 341" of RD 321" of FIG. 5 may be used for selectively determining the latency of one, some, or each one of various RD-LDSP media links 307*rd*, such as RD-LDSP media links 307*rdx*, 307*rdy*, and 307*rdz*, that may be communicatively coupled to various respective user traffic channels 351", such as user traffic channel 351"-1, user traffic channel 351"-2, and user traffic channel 351"-3, through the use of switch 347 and control signal CNTRL. For example, switch 347 and control signal CNTRL may be configured to constantly cycle through coupling RCC 348 to different ones of the available LSDP communication paths 349"-1 through 349-3 at any suitable frequency (e.g., to each one of the available LSDP communication paths every second or every millisecond or at any other suitable frequency) in order for RCC 348 to carry out a ranging procedure on each one of the RD-LSDP media links coupled to a respective one of the available LSDP communication paths in a periodic fashion (e.g., a ranging procedure on RD-LSDP media link 307*rdx* via first RD interconnect channel 361"-1, then a ranging procedure on RD-LSDP media link 307*rdy* via second RD interconnect channel 361"-2, then a ranging procedure on RD-LSDP media link 307*rdz* via third RD interconnect channel 361"-3, then a ranging procedure on RD-LSDP media link 307*rdx* via first RD interconnect channel 361"-1, then a ranging procedure on RD-LSDP media link 307*rdy* via second RD interconnect channel 361"-2, then a ranging procedure on RD-LSDP media link 307*rdz* via third RD interconnect channel 361"-3, etc.). Therefore, each user traffic channel of system 301" may share a ranging channel of system 301" with a ranging signal of a ranging procedure that may be time-multiplexed amongst the user traffic channels. Alternatively, switch 347 and control signal CNTRL may be configured to couple RCC 348 to a particular one of the available LSDP communication paths at any particular moment in order to RCC 348 to carry out a ranging procedure on a particular RD-LSDP media link for any particular reason. As with RCC 348 of RD 321' of system 301' of FIG. 4, RCC 348 of RD 321" of system 301" may be utilize an RD-LSDP media link to carry out a ranging procedure with or without any user traffic simultaneously using that RD-LSDP media link, as the ranging procedure may be completely transparent to any user traffic capabilities of the communication network system.

Figure 6:
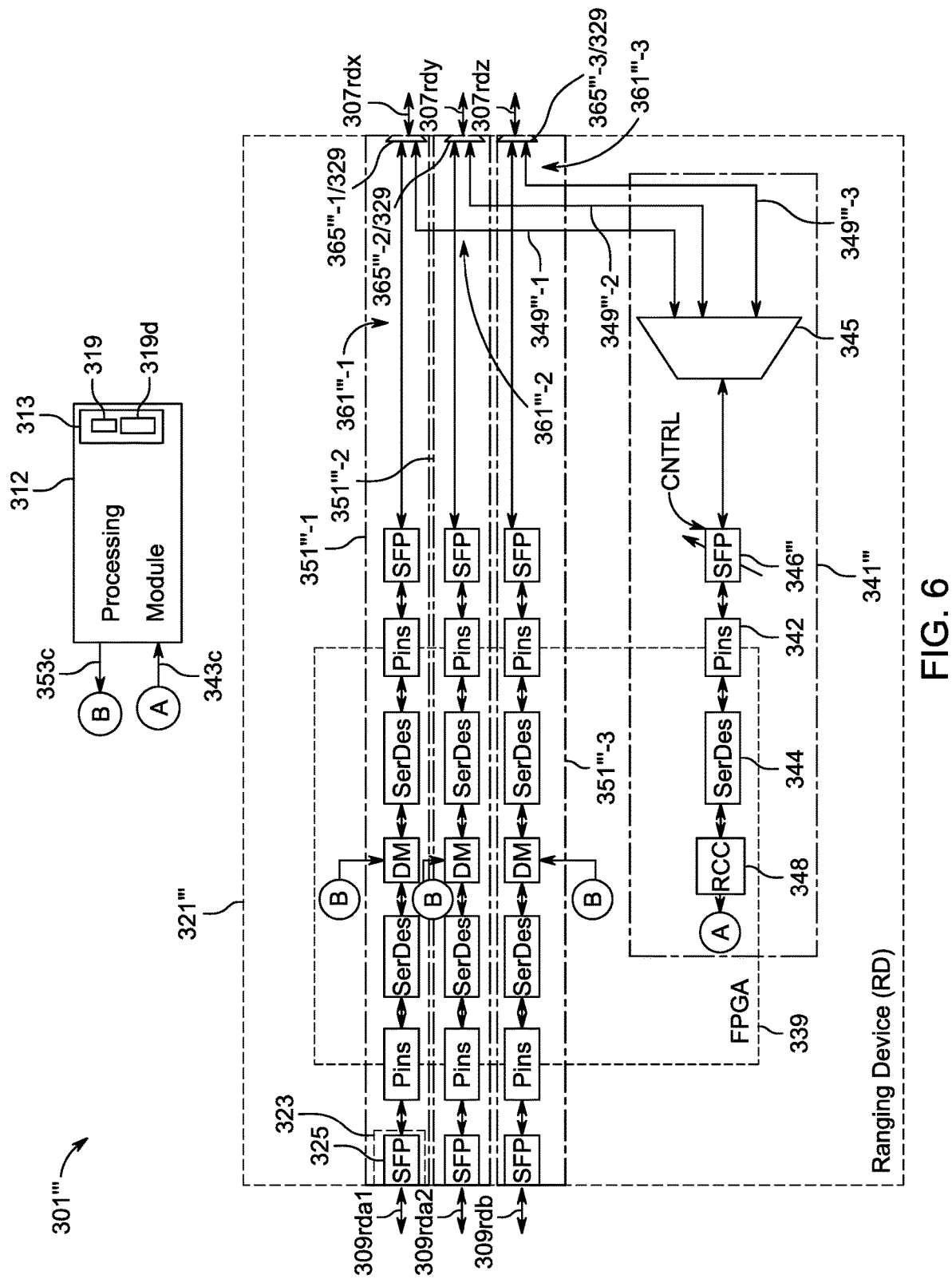
FIG. 6 is a schematic diagram illustrating another portion of a communication network including a deterministic dynamic traffic shaping engine, according to some embodiments of the disclosure.

FIG. 6 shows a portion of an exemplary communication network system 301''', which may be the same as or substantially similar to system 301" of FIG. 5, except as otherwise noted, for providing an RD with multiple user traffic channels that may be utilized with a single ranging traffic channel. The portion of system 301''' of FIG. 6 may include an exemplary RD 321''' that may include (1) an exemplary first RD interconnect channel 361'''-1 with an exemplary first user traffic channel 351'''-1 between a first CD-RD port 323 (e.g., as may be coupled to CD-RD media link 309*rda*1) and a first LSDP-RD port 329 of a first optical coupler 365'''-1 (e.g., as may be coupled to RD-LSDP media link 307*rdx*), (2) an exemplary second RD interconnect channel 361'''-2 with an exemplary second user traffic channel 351'''-2 between a second CD-RD port 323 (e.g., as may be coupled to CD-RD media link 309*rda*2) and a second LSDP-RD port 329 of a second optical coupler 365'''-2 (e.g., as may be coupled to RD-LSDP media link 307*rdy*), (3) an exemplary third RD interconnect channel 361'''-3 with an exemplary third user traffic channel 351'''-3 between a third CD-RD port 323 (e.g., as may be coupled to CD-RD media link 309*rdb*) and a third LSDP-RD port 329 of a third optical coupler 365'''-3 (e.g., as may be coupled to RD-LSDP media link 307*rdz*), and (4) a ranging traffic channel 341''' that may be shared by each one of RD interconnect channels 361'''-1, 361'''-2, and 361'''-3. As shown, in some embodiments, each one of user traffic channels 351'''-1, 351'''-2, and 351'''-3 of FIG. 6 may be the same as user traffic channel 351' of FIG. 4, where any suitable interface module 325 (e.g., SFP) may be provided by each user traffic channel of RD 321''' at the user traffic channel's CD-RD port 323 for translating any optical data received by RD 321''' at a particular CD-RD media link 309*rd* into electrical data for use by the user traffic channel and/or for translating any electrical data provided by the user traffic channel into optical data for transmission onto the particular CD-RD media link 309*rd*. Each one of user traffic channels 351'''-1, 351'''-2, and 351'''-3 of RD 321''' may also include any suitable pin sets, SerDes, additional interface module (e.g., SFP), and DM component(s) (e.g., as described with respect to user traffic channel 351' of FIG. 4). As described with respect to DM component 358 of RD 321' and each DM component of RD 321", each DM component of each one of user traffic channels 351'''-1, 351'''-2, and 351'''-3 of RD 321''' may be operative to add any suitable delay or latency to the electrical data being communicated therethrough. Such delay of each DM may be dictated independently from that of each of the other DMs of the other user traffic channels of RD 321''' by any suitable control link data that may be received at the DM via a control link data input port via any suitable control link data communicative coupling 353*c* using any suitable communication protocol from any suitable processing module 312 of system 301'''. Each one of user traffic channels 351'''-1, 351'''-2, and 351'''-3 of RD 321''' may also include an optical coupler 365''' (e.g., a respective one of couplers 365'''-1, 365'''-2, and 365'''-3), such as an optical multiplexer (e.g., a 2-to 1 multiplexer and a 1-to 2 demultiplexer), where an LSDP-RD port 329 of each user traffic channel of RD 321''' may be provided by the "combined" port of a respective optical coupler 365''', and where each optical coupler 365''' of RD 321''' may also include a first "separated" port (e.g., port 363 of coupler 365 of FIG. 4) of the two separated ports of the coupler and may be associated with the coupler's associated user traffic channel 351''', and a second "separated" port (e.g., port 367 of coupler 365 of FIG. 4) of the two separated ports of the coupler and may be associated with shared ranging traffic channel 341'''. As described with respect to interface module or SFP 326 of RD 321', each additional or right side SFP component of each one of user traffic channels 351'''-1, 351'''-2, and 351'''-3 of RD 321''' may be provided by RD 321''' at a first separated optical port of the particular channel's coupler 365''' for translating any optical data received by that first separated optical port from the LSDP-RD port 329 of the particular channel's coupler 365''' and associated RD-LSDP media link 307*rd* into electrical data for use by the particular user traffic channel 351''' and/or for translating any electrical data provided by the particular user traffic channel 351''' into optical data for transmission by the first separated optical port of the particular channel's coupler 365''' onto LSDP-RD port 329 of the particular channel's coupler 365' and associated RD-LSDP media link 307*rd*.

As shown, like ranging traffic channel 341' of RD 321' of FIG. 4, ranging traffic channel 341''' of RD 321''' of FIG. 6 may include an RCC 348, SerDes 344, pin set 342, and any suitable interface module (e.g., SFP). However, unlike in ranging traffic channel 341' of RD 321' of FIG. 4 where its interface module 346 (e.g, SFP) may be provided at second separated optical port 367 of coupler 365 for translating any optical data received by second separated optical port 367 from the coupler's LSDP-RD port 329 and RD-LSDP media link 307rd into electrical data for use by ranging traffic channel 341' and/or for translating any electrical data provided by ranging traffic channel 341' into optical data for transmission by second separated optical port 367 of coupler 365 onto the coupler's LSDP-RD port 329 and RD-LSDP media link 307rd, such an interface module of ranging traffic channel 341''' of RD 321''' of FIG. 6 may be any suitable tunable interface module 346''' (e.g., any suitable tunable optical transceiver (e.g., for dense wavelength division multiplexer ("DWDM") systems), such as a tunable SFP) that may be coupled to the second separated optical port of each one of the RD interconnect channel couplers 365'''-1, 365'''-2, and 365'''-3 via any suitable multiplexer 345 (e.g., any suitable passive wavelength division multiplexer). As shown, multiplexer 345 may be any suitable multiplexer that may be operative to communicatively couple interface module 346''' of ranging traffic channel 341''' to N LSDP communication paths 349''', such as (1) a first LSDP communication path 349'''-1 that may communicatively couple multiplexer 345 (and, thus, SFP 346''') to the second separated optical port of coupler 365'''-1 of first RD interconnect channel 361'''-1 (e.g., when ranging traffic channel 341''' is utilized with first user traffic channel 351'''-1), (2) a second LSDP communication path 349'''-2 that may communicatively couple multiplexer 345 (and, thus, SFP 346''') to the second separated optical port of coupler 365'''-2 of second RD interconnect channel 361'''-2 (e.g., when ranging traffic channel 341''' is utilized with second user traffic channel 351'''-2), and (3) a third LSDP communication path 349'''-3 that may communicatively couple multiplexer 345 (and, thus, SFP 346''') to the second separated optical port of coupler 365'''-3 of third interconnect channel 361'''-3 (e.g., when ranging traffic channel 341''' is utilized with third user traffic channel 351'''-3). Tunable optical transceiver or tunable SFP 346''' may be similar in operation to a fixed SFP (e.g., SFP 346 of FIGS. 4 and 5), however tunable SFP 346''' may have the added capability of enabling an operator or otherwise to set a channel of (or color) of an emitting laser, which may support any suitable channels (e.g., 88 channels that may be set with a 0.4 nm interval, although only 3 channels may be shown as utilized in FIG. 6, N-channels, such as 16 or 61 or any other suitable number could be used). Any suitable control signal CNTRL may be utilized to control the wavelength or frequency of the optical data communicated by tunable SFP 346'''. For example, control signal CNTRL may be controlled by processing component 348m of RCC 348 or any other suitable processing component or controller of any suitable computing device 339 of RD 321''' (e.g., an FPGA) and/or processing module 312 of system 301'''. While the ranging signal transmitted by RCC 348 of RD 321" of FIG. 5 as communicated via SFP 346 as an optical signal may be configured to have the same wavelength regardless of which LSDP communication path 349" it is to be communicated through or has been communicated from, the ranging signal transmitted by RCC 348 of RD 321''' of FIG. 6 as communicated via SFP 346''' as an optical signal may be configured to have a different wavelength depending on which LSDP communication path 349''' it is to be communicated through or has been communicated from (e.g., based on a tuning of SFP 346'''). In some embodiments, interface module 346''' may be tuned to address a single one of N LSDP communication paths 349''' at a time, each with a ranging signal at a different wavelength, whereby the LSDP to handle the ranging signal may be configured to handle that specific wavelength in particular or to handle all possible ranging signal wavelengths generally while still properly also handling the wavelength(s) of all user traffic. For example, tuning of interface module 346''' may be operative to transmit a ranging signal at a selected wavelength as an optical ranging signal that may be passed to multiplexer 345 (e.g., passive wavelength division demultiplexer) that may be operative to direct the optical signal to one and only one of the output fibers (e.g., LSDP communication path 349'''-1 for a ranging signal at a first wavelength along RD-LDSP media links 307rdx to LSDP 381x, LSDP communication path 349'''-2 for a ranging signal at a second wavelength along RD-LDSP media links 307rdy to LSDP 381y, or LSDP communication path 349'''-3 for a ranging signal at a third wavelength along RD-LDSP media links 307rdz to LSDP 381z). Each LSDP may be operative to return signals of all possible wavelengths for a ranging signal back to multiplexer 345. Once a fiber may be selected by channel 341''' (e.g., by a tunable SFP and WDM demux), the RCC may be operative to send and receive on one of the selected output fibers. For example, an optical combiner 386 of an LSDP may be operative to return a single wavelength ranging signal in the case of the optical switch RD (e.g., FIG. 5) or multiple wavelength ranging signals in the case of a WDM RD (e.g., FIG. 6).

Like ranging traffic channel 341' of RD 321' of FIG. 4, ranging traffic channel 341''' of RD 321''' of FIG. 6 may utilize RCC 348 to carry out a ranging procedure of transmitting and later receiving a ranging signal for enabling determination of a latency of an RD-LDSP media link 307rd communicatively coupled to RCC 348. However, unlike RCC 348 of ranging traffic channel 341' of RD 321' of FIG. 4 that may be used for determining the latency of just one RD-LDSP media link 307rd communicatively coupled to just one user traffic channel 351', RCC 348 of ranging traffic channel 341''' of RD 321''' of FIG. 6 may be used for determining the latency of one, some, or each one of various RD-LDSP media links 307rd, such as RD-LDSP media links 307rdx, 307rdy, and 307rdz, that may be communicatively coupled to various respective user traffic channels 351''', such as user traffic channel 351'''-1, user traffic channel 351'''-2, and user traffic channel 351'''-3, through the use of tunable interface module 346''' and control signal CNTRL and multiplexer 345 and one or more ranging procedures (e.g., in a constantly cycling or periodic or simultaneous or direct approach). As with RCC 348 of RD 321' of system 301' of FIG. 4 and RCC 348 of RD 321" of system 301" of FIG. 5, RCC 348 of RD 321''' of system 301''' may be utilize an RD-LSDP media link to carry out a ranging procedure with or without any user traffic simultaneously using that RD-LSDP media link, as the ranging procedure may be completely transparent to any user traffic capabilities of the communication network system.

Figure 3A:
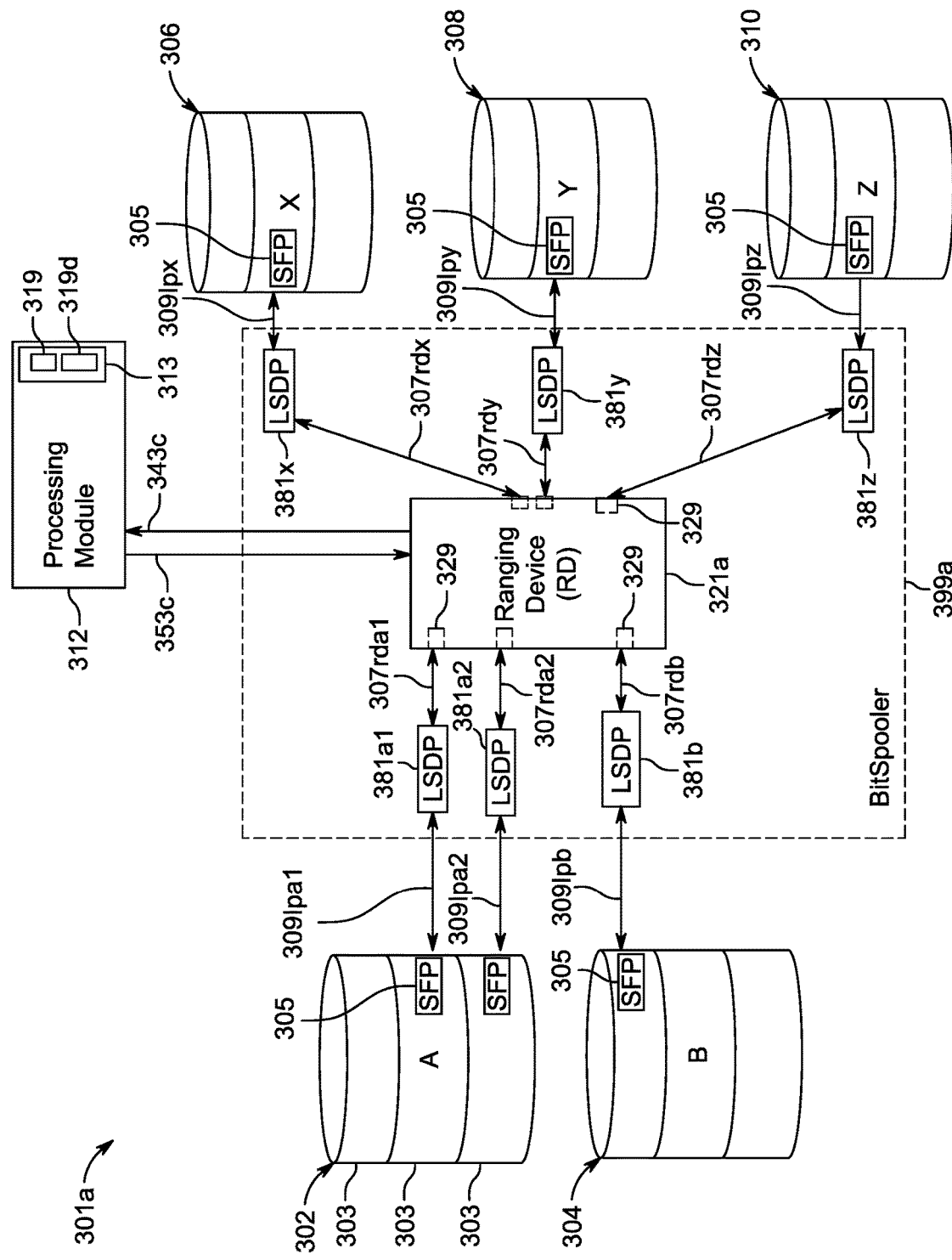
FIG. 3A is a schematic diagram illustrating another system including a portion of a communication network including multiple communication devices and a deterministic dynamic traffic shaping engine, according to some embodiments of the disclosure.

FIG. 3A shows a portion of an exemplary communication network system 301a, which may be the same as or substantially similar to system 301 of FIG. 3, except as otherwise noted, for providing a BitSpooler with an RD and two LSDPs along an interconnect between two user communication devices. For example, as shown in FIG. 3A, an RD 321a of a BitSpooler 399a may include six LSDP-RD ports 329 rather than three LSDP-RD ports 329 and three CD-RD ports 323 of RD 321 of FIG. 3. Moreover, BitSpooler 399a may include six LSDPs 381a1, 381a2, 381b, 381x, 381y, and 381z, rather than just the three latter ones of BitSpooler 399 of FIG. 3. Therefore, while the right side of system 301a of FIG. 3A may be shown as similar to system 301 of FIG. 3, the left side of system 301a may instead include a first path from a first node of device 302 to a first LSDP-RD port 329 via CD-LSDP media link 309lpa1, LSDP 381a1, and a RD-LSDP media link 307rda1, a second path from a second node of device 302 to a second LSDP-RD port 329 via CD-LSDP media link 309lpa2, LSDP 381a2, and a RD-LSDP media link 307rda2, and a third path from a node of device 304 to a third LSDP-RD port 329 via CD-LSDP media link 309lpb, LSDP 381b, and a RD-LSDP media link 307rdb. This type of BitSpooler 399a and other system connections of system 301a of FIG. 3A may be utilized rather than the type of BitSpooler 399 and other system connections of system 301 of FIG. 3 when desired to couple LSDPs to or adjacent each user communication device rather than coupling a ranging device to or adjacent one or more user communication devices.

RD 321a may work similarly to RD 321 of FIG. 3, RD 321' of FIG. 4, RD 321" of FIG. 5, and/or RD 321'" of FIG. 6, except that twice as many RD-LSDP media links 307rd may have to be ranged for determining their native latencies. For example, although not shown, RD 321a may be provided with six distinct ranging traffic channels (e.g., six distinct RCC's, etc.), one for each LSDP-RD port 329 (e.g., similar to the concept described with respect to FIG. 4). Alternatively, RD 321a may include one or more shared ranging traffic channels.

Figure 10:
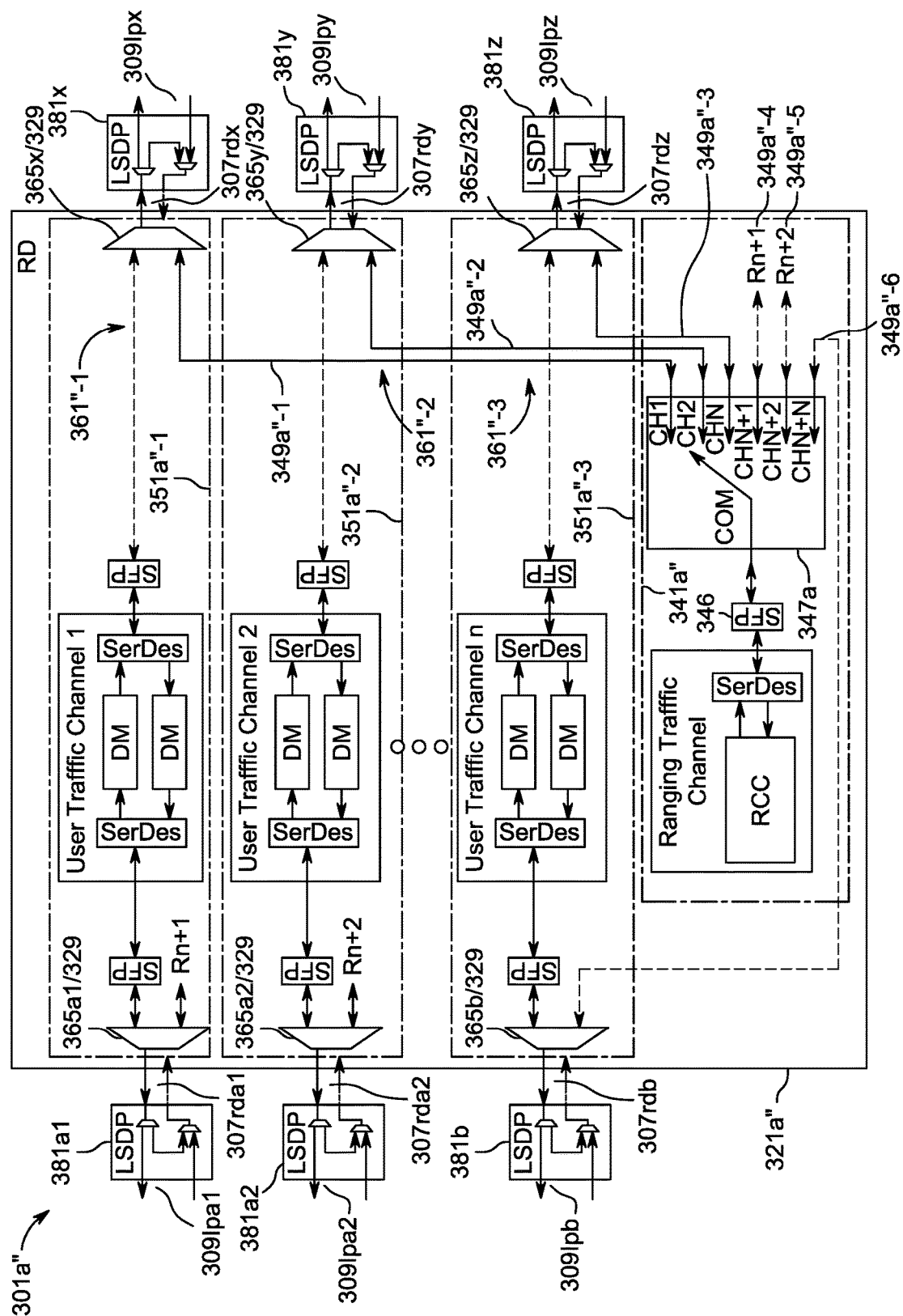
FIG. 10 is a schematic diagram illustrating another portion of a communication network including a deterministic dynamic traffic shaping engine, according to some embodiments of the disclosure.
Figure 11:
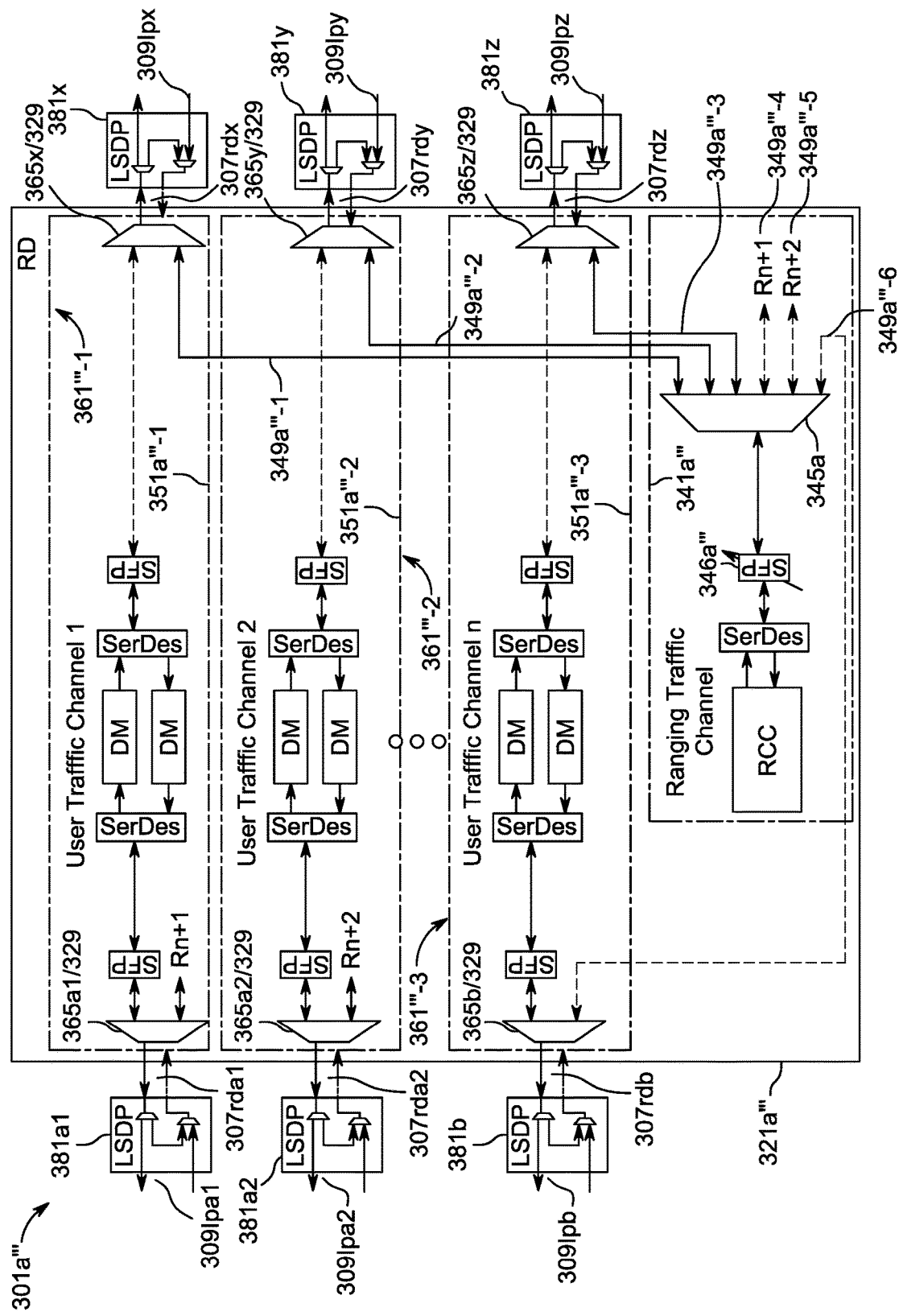
FIG. 11 is a schematic diagram illustrating another portion of a communication network including a deterministic dynamic traffic shaping engine, according to some embodiments of the disclosure.

For example, FIG. 10 shows a portion of an exemplary communication network 301a" that may be similar to system 301a of FIG. 3A but with an RD 321a", which may be similar to RD 321" of FIG. 5 but showing the three additional LSDP-RD ports 329, where each of the six LSDP-RD ports 329 are in one of couplers 365a1, 365a2, 365b, 365x, 365y, and 365z, with a first user traffic channel 351"-1 of a first RD interconnect channel 361"-1 extending between couplers 365a1 and 365x, a second user traffic channel 351"-2 of a second RD interconnect channel 361"-2 extending between couplers 365a2 and 365y, and a third user traffic channel 351"-3 of a third RD interconnect channel 361"-3 extending between couplers 365b and 365z. A shared ranging traffic channel 341a" of RD 321a" of FIG. 10 may be similar to ranging traffic channel 341" of RD 321" of FIG. 5, except, rather than including optical switch 347 with only N LSDP communication paths 349" (e.g., 3 as shown in FIG. 5), shared ranging traffic channel 341a" may include an optical switch 347a with N+N LSDP communication paths 349" (e.g., 6 as shown in FIG. 10). For example, as shown in FIG. 10, optical switch 347a may be any suitable switch that may be operative to communicatively couple interface module (e.g., SFP) 346 of ranging traffic channel 341a" selectively to one of N+N LSDP communication paths 349a", such as selectively to one of (1) a first LSDP communication path 349a"-1 that may communicatively couple switch 347a (and, thus, selectively SFP 346) to the second separated optical port of coupler 365x of first RD interconnect channel 361"-1 (e.g., when ranging traffic channel 341a" is to be utilized with a first RD-LSDP media link 307rdx of first user traffic channel 351a"-1), (2) a second LSDP communication path 349a"-2 that may communicatively couple switch 347a (and, thus, selectively SFP 346) to the second separated optical port of coupler 365y of second RD interconnect channel 361"-2 (e.g., when ranging traffic channel 341a" is to be utilized with a first RD-LSDP media link 307rdy of second user traffic channel 351a"-2), (3) a third LSDP communication path 349a"-3 that may communicatively couple switch 347a (and, thus, selectively SFP 346) to the second separated optical port of coupler 365z of third RD interconnect channel 361"-3 (e.g., when ranging traffic channel 341a" is to be utilized with a first RD-LSDP media link 307rdz of third traffic channel 351a"-3), (4) a fourth LSDP communication path 349a"-4 that may communicatively couple switch 347a (and, thus, selectively SFP 346) to the second separated optical port of coupler 365a1 of first RD interconnect channel 361"-1 (e.g., when ranging traffic channel 341a" is to be utilized with a second RD-LSDP media link 307rda1 of first user traffic channel 351a"-1), (5) a fifth LSDP communication path 349a"-5 that may communicatively couple switch 347a (and, thus, selectively SFP 346) to the second separated optical port of coupler 365a2 of second RD interconnect channel 361"-2 (e.g., when ranging traffic channel 341a" is to be utilized with a second RD-LSDP media link 307rda2 of second user traffic channel 351a"-2), and (6) a sixth LSDP communication path 349a"-6 that may communicatively couple switch 347a (and, thus, selectively SFP 346) to the second separated optical port of coupler 365b of third interconnect channel 361"-3 (e.g., when ranging traffic channel 341a" is to be utilized with a second RD-LSDP media link 307rdb of third traffic channel 351a"-3), As another example, FIG. 11 shows a portion of an exemplary communication network 301a'" that may be similar to system 301a of FIG. 3A but with an RD 321aa'", which may be similar to RD 321'" of FIG. 6 but showing the three additional LSDP-RD ports 329, where each of the six LSDP-RD ports 329 are in one of couplers 365a1, 365a2, 365b, 365x, 365y, and 365z, with a first user traffic channel 351'"-1 of a first RD interconnect channel 361'"-1 extending between couplers 365a1 and 365x, a second user traffic channel 351'"-2 of a second. RD interconnect channel 361'"-2 extending between couplers 365a2 and 365y, and a third user traffic channel 351'"-3 of a third RD interconnect channel 361'"-3 extending between couplers 365b and 365z. A shared ranging traffic channel 341a'" of RD 321a'" of FIG. 11 may be similar to ranging traffic channel 341'" of RD 321'" of FIG. 6, except, rather than including multiplexer 345 with only N LSDP communication paths 349'" (e.g., 3 as shown in FIG. 6), shared ranging traffic channel 341a'" may include a multiplexer 345a with N+N LSDP communication paths 349'" (e.g., 6 as shown in FIG. 11). For example, as shown in FIG. 11, multiplexer 345a may be any suitable component that may be operative to communicatively couple interface module (e.g., tunable SFP) 346a'" of ranging traffic channel 341a'" to N+N LSDP communication paths 349a'", such as selectively to (1) a first LSDP communication path 349a'"-1 that may communicatively couple SFP 346a'" to the second separated optical port of coupler 365x of first RD interconnect channel 361'"-1 (e.g., when ranging traffic channel 341a'" is to be utilized with a first RD-LSDP media link 307rdx of first user traffic channel 351a'"-1), (2) a second LSDP communication path 349a'"-2 that may communicatively couple SFP 346a'" to the second separated optical port of coupler 365y of second RD interconnect channel 361""-2 (e.g., when ranging traffic channel 341a'" is to be utilized with a first RD-LSDP media link 307rdy of second user traffic channel 351a'"-2), (3) a third LSDP communication path 349a'"-3 that may communicatively couple SFP 346a'" to the second separated optical port of coupler 365z of third RD interconnect channel 361'"-3 (e.g., when ranging traffic channel 341a'" is to be utilized with a first RD-LSDP media link 307*rdz* of third traffic channel 351*a*'''-3), (4) a fourth LSDP communication path 349*a*'''-4 that may communicatively couple SFP 346*a*Δ'' to the second separated optical port of coupler 365*a*1 of first RD interconnect channel 361'''-1 (e.g., when ranging traffic channel 341*a*''' is to be utilized with a second RD-LSDP media link 307*rda*1 of first user traffic channel 351*a*'''-1), (5) a fifth LSDP communication path 349*a*'''-5 that may communicatively couple SFP 346*a*''' to the second separated optical port of coupler 365*a*2 of second RD interconnect channel 361'''-2 (e.g., when ranging traffic channel 341*a*''' is to be utilized with a second RD-LSDP media link 307*rda*2 of second user traffic channel 351*a*'''-2), and (6) a sixth LSDP communication path 349*a*'''-6 that may communicatively couple SFP 346*a*''' to the second separated optical port of coupler 365*b* of third RD interconnect channel 361'''-3 (e.g., when ranging traffic channel 341*a*''' is to be utilized with a second RD-LSDP media link 307*rdb* of third traffic channel 351*a*'''-3).

When there are twice as many LSDPs, there may also be twice as many RD-LSDP media links 307 to range. As shown in FIGS. 10 and 11, a single shared ranging traffic channel (e.g., a single RCC) may or may not be able to handle all of the ranging. Instead, in some embodiments (not shown), a first RCC's ranging traffic channel may range a first amount of the RD-LSDP media links, while a second RCC's ranging traffic channel may range a second amount of the RD-LSDP media links (e.g., at the same time as the first RCC's ranging traffic channel may range the first amount of the RD-LSDP media links (e.g., in parallel)). All determined native latencies may be received and handled by the same processing module (e.g., a module 312) for determining how to adjust the latency added to one or more of the user traffic channels of the system or otherwise to manage one or more system parameters or security considerations of the system. Additionally or alternatively, although not shown, it is to be understood that a communication network system may include two or more BitSpoolers (e.g., two or more RD's), while all determined native latencies of all RD-LSDP media links of all of the BitSpoolers may be received and handled by the same processing module (e.g., a module 312) for determining how to adjust the latency added to one or more of the user traffic channels of the system or otherwise to manage one or more system parameters or security considerations of the system. Although not shown, it is also to be understood that a BitSpooler may enable a communication link between any two user communication devices of a communication network system to include only a single LSDP (e.g., like each of the communication links of FIG. 3) while that same BitSpooler may enable another communication link between any two user communication devices of that same communication network system to include two LSDPs (e.g., like each of the communication links of FIG. 3A).

Figure 8:
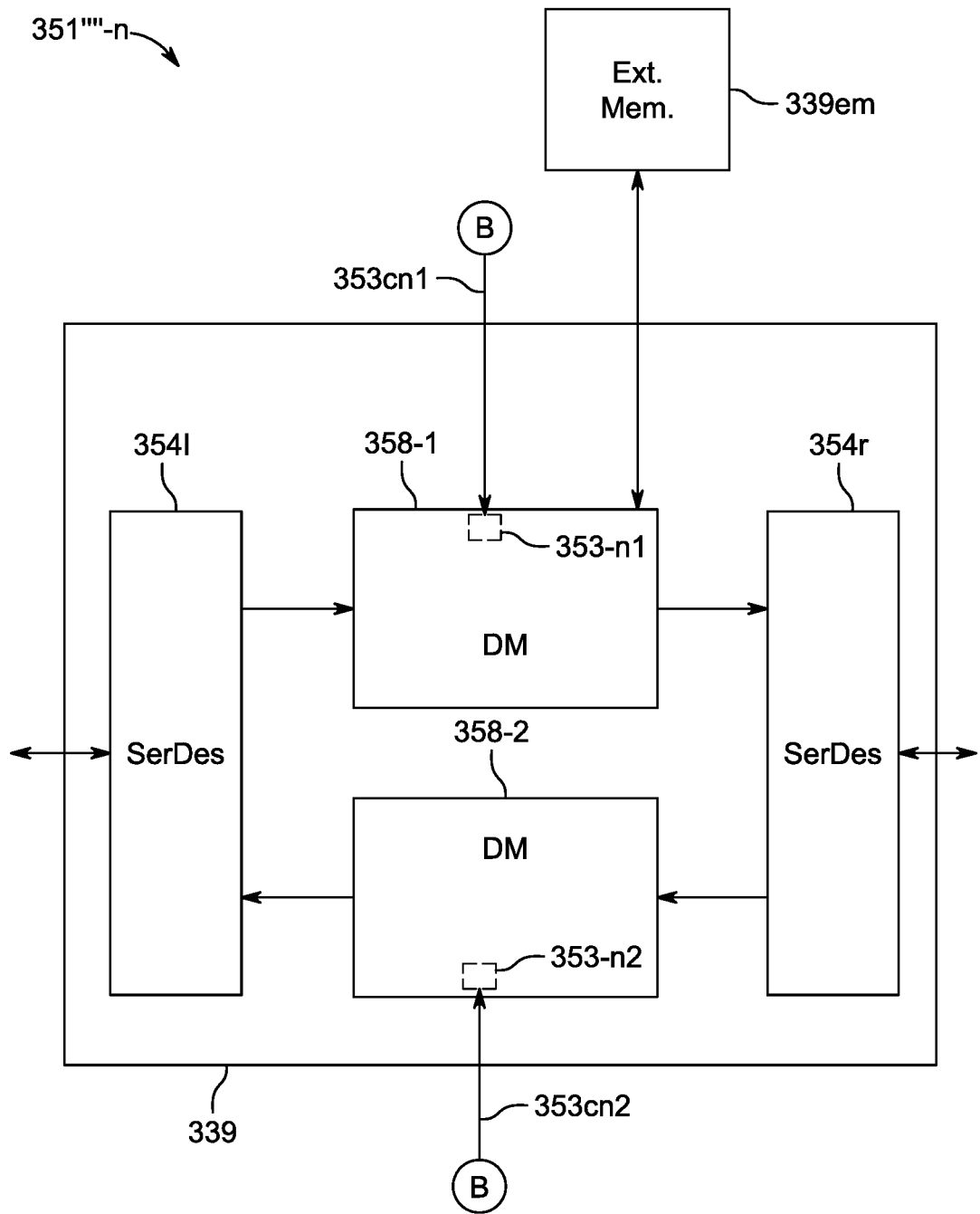
FIG. 8 is a schematic diagram illustrating another portion of a communication network including a deterministic dynamic traffic shaping engine, according to some embodiments of the disclosure.

As shown by each user traffic channel 351*a*'' of FIG. 10, each user traffic channel 351*a*''' of FIG. 11, and also by a portion of a user traffic channel 351''''-*n* of FIG. 8, it is to be understood that a user traffic channel may include two DMs 358. For example, as shown in FIG. 8, a first DM 358-1 of a particular user traffic channel for enabling user traffic data to be communicated between two particular end user communication devices may be operative to add any suitable delay or latency to the electrical data being communicated therethrough from SerDes 354*l* to SerDes 354*r* (e.g., based on any suitable first control link data that may be received at a control link data input port 353-*n*1 of DM 358-1 or otherwise via any suitable control link data communicative coupling 353*cn*1 using any suitable communication protocol from any suitable processing module of the communication network system), while a second DM 358-2 of that same particular user traffic channel for enabling user traffic data to be communicated between those same two particular end user communication devices but in the opposite direction may be operative to add any suitable delay or latency to the electrical data being communicated therethrough from SerDes 354*r* to SerDes 354*l*(e.g., based on any suitable second control link data that may be received at a control link data input port 353-*n*2 of DM 358-2 or otherwise via any suitable control link data communicative coupling 353*cn*2 using any suitable communication protocol from any suitable processing module of the communication network system). fn some embodiments, the same delay or latency (if any) may be added by each one of the DMs of the user traffic channel. However, in other embodiments, a different delay or latency may be added by different DMs of the user traffic channel. In some embodiments, different DMs of a particular user traffic channel may be operative to apply different latencies (e.g., a delay applied by DM 358-1 may be greater than a delay applied by DM 358-2 if it is determined to have the latency of user traffic communicated from device 302 to device 306 to be greater than the latency of user traffic communicated from device 306 to device 302). Moreover, applying different latencies to different directions of traffic flow through a user traffic channel of an RD may enable different types of equalization and/or other traffic shaping. For example, in an embodiment where each user traffic channel is to be equalized, a first DM 358-1 of each user traffic channel may be configured with a certain respective delay such that the latency for sending data from the RD to any user device to the right of the RD may be equalized with one another (e.g., to equalize CD-LSDP media links 309*lpx*, 309*lpy*, and 309*lpz*), while a second DM 358-2 of each user traffic channel may be configured with a certain respective delay such that the latency for sending data from the to any user devices to the left of the RD may be equalized with one another (e.g., to equalize CD-LSDP media links 309*lpa*1, 309*lpa*2, and 309*lpb*).

As mentioned, one or more RDs of one or more BitSpoolers communicatively coupling two or more pairs of end user communication devices of a communication network may be operative to determine the native latency of one, some, or each variable or adjustable or unknown or uncontrolled media link (e.g., RD-LSDP media link) of the communication network and any suitable processing or controller module(s) may be configured to access and utilize one or more of such determined latencies to manage the communication network in one or more suitable ways (e.g., for programmatically adjusting the delay of any RD-LSDP media link based on any suitable data (e.g., in accordance with any suitable policies (e.g., user-defined policies) on a per-link basis) or for otherwise deterministically and/or dynamically shaping traffic of the communication network and/or monitoring the health of the communication network based on any suitable data (e.g., in accordance with any suitable policies (e.g., user-defined policies) on a per-link basis), such as determining if a link becomes significantly slower than usual or is cut-off or not useful and then reporting such a determination immediately to an operator or other entity with an interest in the network (e.g., via an I/O component of the processing module or otherwise) (e.g., using a simple network management protocol ("SNMP")). In some embodiments, all delays of user traffic channels can be standardized to be equal or greater than the longest individual native delay. By holding some or all data packets for as long as necessary to establish standardized time-of-flight among them, they may be able to be received at the same time. A BitSpooler may be placed between the two end devices (one or more of which may have an LSDP coupled proximate/adjacent thereto in a controlled manner and can add various delays, zero or greater to one or more paths between an LSDP and an RD of the BitSpooler. Regardless of the original fiber delay on any given fiber, the BitSpooler may be configured to adapt so that all data can be delivered at the same time. This delay can be adjusted to the longest fiber of any length, or it can be set to a standardized system latency. In other embodiments (e.g., for more complicated scenarios), traffic can be shaped either by smoothing, by intentionally introducing burstiness, or by adding controlled jitter to one, some, or each path. Various configurable elements of such a BitSpooler communication network system may include, but are not limited to, standardized latency for a group of links, network operator policy configurations, including, but not limited to, threshold(s) for alarms and alerts due to changes, time-out for a link, maximum packet size allowed to be sent, maximum throughput allowed for a link or otherwise, and/or the like.

One or more RDs and any suitable processing modules of a communication network system may be configured to monitor (e.g., including tracking all configurable elements) and report (e.g., to a network operator (e.g., via any suitable external link)) on the any suitable behavioral characteristics, including, but not limited to, a measured latency of one, some, or each fiber connected to a port, total latency of each cross connect (e.g., if an LSDP on each side of an RD for a given communication device node to communication device node path), delta between the total latency and the standardized latency, delay added per link, variance between the largest and smallest latency number post-standardization (e.g., there may be inherent jitter in any measurement, and the system may be operative to store both the largest and smallest values and potentially monitor if the delta ever exceeds a certain threshold (e.g., a 10 ns delta) and alert an operator if so), up-time on a per port basis (e.g., counters may be maintained that may monitor how long each link remains locked or times out such that it may be determined that a link is not healthy), alarms may be utilized if a change in measured latency relative to a baseline measurement on a per-port basis occurs (e.g., for security reasons) and/or if there is a drop in a link or drop in measured light levels on a per port basis, or system uptime and key performance indicators may be detected, such as operating temperature, individual port metrics (e.g., temperature, light levels, data rate, Bit Error Rate), system level issues (e.g., power supply failure, etc.), and/or the like. For example, any suitable sensor, such as sensor 15 of device 120, may be provided by an RD and used to determine any suitable characteristic(s) about the RD or any component(s) thereof, including the temperature of the RB, which may overheat due to the powering of the active device (e.g., by including a temperature sensor in a chassis in which the RD or a portion thereof may be housed). Any suitable temperature(s) of the RD may therefore be detected and used for any suitable purpose (e.g., to report any potential problem to an operator for further inspection).

In order to enable piecemeal network upgrade, a BitSpooler can be added to a network in a piecemeal fashion because neither an RD or an LSDP piece by itself materially affects the network. For instance, replacing a regular patch panel with an LSDP patch panel may be completely transparent to a network operator. The user traffic may pass through the LSDP just as it did with the original patch panel.

Also, simply inserting an RD into a network may add very little latency to any path therethrough (e.g., approximately 50 ns of delay (e.g., equivalent to approximately 3 feet of fiber-optic cable) or less. It is precisely this ability that may be critical to any large-scale network upgrade because it can allow a methodical retrofit with minimal risk to ongoing operations. Then, such a BitSpooler can be enabled on a per-link basis (e.g., latency may be controlled on a per-link basis (e.g., on a per user traffic channel data direction basis)). Again, this can allow for a methodical and controlled transition with minimal risks, and with the ability to quickly isolate any problematic links.

SNR on optical links may be maintained. A BitSpooler's RD may be operative to regenerate an optical signal. In other words, an RD may receive an optical signal, convert it to an electrical signal, and then convert it back to an optical signal. As a result, the RD may not introduce loss into the path.

Additional network security may be enabled by systems of this disclosure. Many common communication networks may largely operate on a principle of trust because network operators cannot detect cable changes. For instance, if a cable between two nodes is replaced by one of a different length, there is often no way to detect it. On the other hand, because a BitSpooler may be configured to continuously monitor the latencies on the cables that are attached to it, it can be used to detect changes in a network, and to notify the network operator. Beyond generally detecting and controlling the latency of a communication link, a BitSpooler system may also be enabled to cany out any other suitable deterministic dynamic traffic shaping. For example, a BitSpooler may be enabled to smooth out bursty traffic or to add burstiness to a channel (e.g., by selectively adding different latency between different data packets at certain intervals (e.g., rather than adding a certain amount of delay to each user data packet, different amounts of delay may be added between different packets (e.g., 1 millisecond delay after every 10 data packets vs, 0.1 millisecond delay after every data packet, etc.))). Therefore, a delay module may be used to programmably add delay after any suitable number of packets or in any suitable pattern (e.g., F delay after ten packets, then G delay after next 5 packets, then H delay after next 5 packets, then F delay after next 10 packets, etc., where F, G, and H may be different durations of delay). In some embodiments, jitter or randomness may be added to one, some, or each link for any suitable purpose.

While various types of passive ranging have been described, active ranging may be accomplished via a frame or packet based "signal" by utilizing any suitable protocol, or a proprietary Layer 2 or Layer 3 protocol. For that case, an LSDP may be either implemented in hardware, software, or some combination of the two A ranging function may establish the latency of each connected device via a wide area network ("WAN") and continuously monitor the delta between the session and the standardized latency, In this way, changes in latency of any remote connection that may be caused by changes in the network such as open shortest path first ("OSPF") routing protocol, congestion, or other factors may be accommodated. An RD may be configured to measures the latency of a physical media optically to the LSDP. The delay over wide area networks can be measured with industry standard methods, such as internet control message protocol ("ICMP") and precision time protocol ("PTP"), that may use any suitable combination of hardware and software. The delay function can be used independently of the LSDP for any required delay (e.g., with sufficient RAM storage). Reordering traffic may utilize storage and processing that may be more complex than a simple delay.

Although only five communication devices (e.g., devices 102, 104, 106, 108, and 110) and three distinct interconnects (e.g., device 102 to device 106, device 102 to device 108, and device 106 to device 110) may be shown in various embodiments of the disclosure, it is to be understood that any suitable number of servers, with any suitable number of interface modules, may be handled by one or more Bit-Spoolers in a system for enabling any suitable number of distinct interconnects. One or more user traffic channels may have its ranging turned on or off. Some channels of an RD may not include any electronic circuitry but may simply pass through optically. In some embodiments (not shown), an RD may include a safety bypass that may be optical for optically coupling two appropriate LSDP-RD ports 329 of a user traffic channel or an appropriate CD-RD ports 323 and a LSDP-RD port 329 of a user traffic channel (e.g., as a precaution for power failure of the RD). Some channels may not include any LSDPs, even though BitSpooler does not impact signal integrity (e.g., path from device 104 to device 110 may not include any LSDPs (not shown) and may not be ranged, but may still be shaped by an RD along the path.

One, some, or all of the processes described with respect to FIGS. 1-11 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 of a network device 120). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from a central network controller device to a router device or from a data device to any network device. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for providing deterministic dynamic traffic shaping for communication networks, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the concepts of the disclosure can be practiced by other than the described embodiments, which are presented for purposes of illustration rather than of limitation.

What is claimed is:

1. A system for controlling a communication network comprising a plurality of network communication nodes and a plurality of media links, the system comprising:
  a first active ranging device; and
  a first passive optical coupler device, wherein:
    the first active ranging device comprises:
      a first ranging device ("RD") port operative to be communicatively coupled to a first communication network node of the plurality of network communication nodes by a first media link of the plurality of media links; and
      a second RD port operative to be communicatively coupled to the first passive optical coupler device by a second media link of the plurality of media links;
    the first passive optical coupler device comprises:
      a first optical coupler ("OC") port operative to be communicatively coupled to a second communication network node of the plurality of network communication nodes by a third media link of the plurality of media links; and
      a second OC port operative to be communicatively coupled to the second RD port by the second media link;
    the first active ranging device further comprises a first user traffic channel operative to communicatively couple the first RD port to the second RD port;
    the first active ranging device further comprises a first ranging traffic channel operative to communicatively couple a first ranging channel calculator ("RCC") of the first active ranging device to the second RD port; and
    the first passive optical coupler device further comprises:
      a first optical splitter; and
      a first optical combiner, wherein:
        the first optical splitter is operative to split first output RD data received by the second OC port into first RD user traffic data for the first OC port and first output ranging signal traffic data for the first optical combiner; and
        the first optical combiner is operative to combine the first output ranging signal traffic data from the first optical splitter and end user traffic data from the first OC port into first input RD data for the second OC port.

2. The system of claim 1, wherein the first active ranging device further comprises a wavelength-division multiplexer that is operative to combine the first output ranging signal traffic data from the first RCC and the first RD user traffic data from the first user traffic channel into the first output RD data for the second RD port.

3. The system of claim 1, wherein the first active ranging device further comprises a wavelength-division multiplexer that is operative to split the first input RD data received by the second RD port into first input ranging signal traffic data for the first RCC and second RD user traffic data for the first user traffic channel.

4. The system of claim 3, wherein the wavelength-division multiplexer is further operative to combine the first output ranging signal traffic data from the first RCC and the first RD user traffic data from the first user traffic channel into the first output RD data for the second RD port.

5. The system of claim 1 further comprising a second passive optical coupler device, wherein:
the first active ranging device further comprises:
a third RD port operative to be communicatively coupled to a third communication network node of the plurality of network communication nodes by a fourth media link of the plurality of media links; and
a fourth RD port operative to be communicatively coupled to the second passive optical coupler device by a fifth media link of the plurality of media links;
the second passive optical coupler device comprises:
a third OC port operative to be communicatively coupled to a fourth communication network node of the plurality of network communication nodes by a sixth media link of the plurality of media links; and
a fourth OC port operative to be communicatively coupled to the fourth RD port by the fifth media link;
the first active ranging device further comprises a second user traffic channel operative to communicatively couple the third RD port to the fourth RD port;
the first active ranging device further comprises a second ranging traffic channel operative to communicatively couple a second RCC of the first active ranging device to the fourth RD port; and
the second passive optical coupler device further comprises:
a second optical splitter; and
a second optical combiner, wherein:
the second optical splitter is operative to split second output RD data received by the fourth OC port into third RD user traffic data for the third OC port and second output ranging signal traffic data for the second optical combiner; and
the second optical combiner is operative to combine the second output ranging signal traffic data from the second optical splitter and end user traffic data from the third OC port into second input RD data for the fourth OC port.

6. The system of claim 5, wherein the first active ranging device further comprises:
a first wavelength-division multiplexer that is operative to combine the first output ranging signal traffic data from the first RCC and the first RD user traffic data from the first user traffic channel into the first output RD data for the second RD port; and
a second wavelength-division multiplexer that is operative to combine the second output ranging signal traffic data from the second RCC and the third RD user traffic data from the second user traffic channel into the second output RD data for the fourth RD port.

7. The system of claim 5, wherein the first active ranging device further comprises:
a first wavelength-division multiplexer that is operative to split the first input RD data received by the second RD port into first input ranging signal traffic data for the first RCC and second RD user traffic data for the first user traffic channel; and
a second wavelength-division multiplexer that is operative to split the second input RD data received by the fourth port into second input ranging signal traffic data for the second RCC and fourth RD user traffic data for the second user traffic channel.

8. The system of claim 7, wherein:
the first wavelength-division multiplexer is further operative to combine the first output ranging signal traffic data from the first RCC and the first RD user traffic data from the first user traffic channel into the first output RD data for the second RD port; and
the second wavelength-division multiplexer is further operative to combine the second output ranging signal traffic data from the second RCC and the third RD user traffic data from the second user traffic channel into the second output RD data for the fourth RD port.

9. The system of claim 1 further comprising a second passive optical coupler device, wherein:
the first active ranging device further comprises:
a third RD port operative to be communicatively coupled to a third communication network node of the plurality of network communication nodes by a fourth media link of the plurality of media links; and
a fourth RD port operative to be communicatively coupled to the second passive optical coupler device by a fifth media link of the plurality of media links;
the second passive optical coupler device comprises:
a third OC port operative to be communicatively coupled to a fourth communication network node of the plurality of network communication nodes by a sixth media link of the plurality of media links; and
a fourth OC port operative to be communicatively coupled to the fourth RD port by the fifth media link;
the first active ranging device further comprises a second user traffic channel operative tr communicatively couple the third RD port to the fourth RD port;
the first ranging traffic channel is further operative to communicatively couple the first RCC to the fourth RD port; and
the second passive optical coupler device further comprises:
a second optical splitter; and
a second optical combiner, wherein:
the second optical splitter is operative to split second output RD data received by the fourth OC port into third RD user traffic data for the third OC port and second output ranging signal traffic data for the second optical combiner; and
the second optical combiner is operative to combine the second output ranging signal traffic data from the second optical splitter and end user traffic data from the third OC port into second input RD data for the fourth OC port.

10. The system of claim 9, wherein the first active ranging device further comprises:
a first wavelength-division multiplexer that is operative to combine the first output ranging signal traffic data from the first RCC and the first user traffic data from the first user traffic channel into the first output RD data for the second RD port; and a second wavelength-division multiplexer that is operative to combine the second output ranging signal traffic data from the first RCC and the third RD user traffic data from the second. user traffic channel into the second output RD data for the fourth RD port.

11. The system of claim 9, wherein the first active ranging device further comprises:
a first wavelength-division multiplexer that is operative to split the first input RD data received by the second RD port into first input ranging signal traffic data for the first RCC and second RD user traffic data for the first user traffic channel; and
a second wavelength-division multiplexer that is operative to split the second input RD data received by the fourth RD port into second input ranging signal traffic data for the first RCC and fourth RD user traffic data for the second user traffic channel.

12. The system of claim 11, wherein:
the first wavelength-division multiplexer is further operative to combine the first output ranging signal traffic data from the first RCC and the first RD user traffic data from the first user traffic channel into the first output RD data for the second RD port; and
the second wavelength-division multiplexer is further operative to combine the second output ranging signal traffic data from the first RCC and the third RD user traffic data from the second user traffic channel into the second output RD data for the fourth RD port.

13. The system of claim 12, wherein the first active ranging device further comprises a switch operative to selectively communicatively couple the first RCC to one of:
the first wavelength-division multiplexer; or
the second wavelength-division multiplexer.

14. The system of claim 12, wherein the first active ranging device further comprises:
a tunable interface module for varying a wavelength of output ranging signal traffic data from the first RCC; and
a passive wavelength division multiplexer that is operative to selectively communicatively couple the tunable interface module to one of:
the first wavelength-division multiplexer; or
the second wavelength-division multiplexer.

15. The system of claim 9, wherein:
the first active ranging device further comprises a first wavelength-division multiplexer that is operative to split the first input RD data received by the second RD port into first input ranging signal traffic data for the first RCC and second RD user traffic data for the first user traffic channel;
the first RCC is operative to generate a ranging signal for defining the first output ranging signal traffic data of the first output RD data;
the first RCC is further operative detect the ranging signal from the first input ranging signal traffic data; and
the first RCC is able to calculate a duration of time between generating the ranging signal of the first output ranging signal traffic data and detecting the ranging signal from the first input ranging signal traffic data.

16. The system of claim 15, wherein:
the second user traffic channel comprises a delay module operative to add a particular latency to any end user traffic data to be communicated between the third RD port and the fourth RD port; and the system further comprises a processing module operative to:
access the calculated duration of time; and
define the particular latency based on the calculated duration of time.

17. The system of claim 15, wherein:
the ranging signal comprises a pseudo-random sequence;
the first RCC is able to calculate a bit error rate between the generated ranging signal of the first output ranging signal traffic data and the detected ranging signal from the first input ranging signal traffic data; and
the second user traffic channel comprises a delay module operative to add a particular latency to any end user traffic data to be communicated between the third RD port and the fourth RD port; and
the system further comprises a processing module operative to:
define the particular latency based on the calculated duration of time; and
define an alarm based on the calculated bit error rate.

18. The system of claim 9, wherein:
the first active ranging device further comprises a first wavelength-division multiplexer that is operative to split the first input RD data received by the second RD port into first input ranging signal traffic data for the first RCC and second RD user traffic data for the first user traffic channel;
the first active ranging device fUrther comprises a second wavelength-division multiplexer that is operative to split the second input RD data received by the fourth RD port into second input ranging signal traffic data for the first RCC and fourth RD user traffic data for the second user traffic channel
the first RCC is operative to:
generate a first ranging signal for defining the first output ranging signal traffic data of the first output RD data;
detect the first ranging signal from the first input ranging signal traffic data;
calculate a first duration of time between generating the first ranging signal of the first output ranging signal traffic data and detecting the first ranging signal from the first input ranging signal traffic data;
generate a second ranging signal for defining the second output ranging signal traffic data of the second output RD data;
detect the second ranging signal from the second input ranging signal traffic data;
calculate a second duration of time between generating the second ranging signal of the second output ranging signal traffic data and detecting the second ranging signal from the second input ranging signal traffic data;
the first user traffic channel comprises a first delay module operative to add a first particular latency to any end user traffic data to be communicated between the first RD port and the second RD port;
the second user traffic channel comprises a second delay module operative to add a second particular latency to any end user traffic data to be communicated between the third RD port and the fourth RD port; and
the system further comprises a processing module operative to define the second particular latency to be different than the first particular latency based on the calculated first duration of time and on the calculated second duration of time.

19. A system for controlling a communication network comprising a plurality of network communication nodes and a plurality of media links, the system comprising:
- an active ranging device;
- a first passive optical coupler device; and
- a second passive optical coupler device, wherein:
  - the active ranging device comprises:
    - a first ranging device ("RD") port operative to be communicatively coupled to a first communication network node of the plurality of network communication nodes by a first media link of the plurality of media links;
    - a second RD port operative to be communicatively coupled to the first passive optical coupler device by a second media link of the plurality of media links;
    - a third port operative to be communicatively coupled to a third communication network node of the plurality of network communication nodes by a fourth media link of the plurality of media links; and
    - a fourth RD port operative to be communicatively coupled to the second passive optical coupler device by a fifth media link of the plurality of media links;
  - the first passive optical coupler device comprises
    - a first optical coupler ("OC") port operative to be communicatively coupled to a second communication network node of the plurality of network communication nodes by a third media link of the plurality of media links; and
    - a second OC port operative to be communicatively coupled to the second RD port by the second media link;
  - the second passive optical coupler device comprises:
    - a third OC port operative to be communicatively coupled to a fourth communication network node of the plurality of network communication nodes by a sixth media link of the plurality of media links; and
    - a fourth OC port operative to be communicatively coupled to the fourth RD port by the fifth media link;
  - the active ranging device further comprises:
    - a first user traffic channel operative to communicatively couple the first RD port to the second RD port;
    - a second user traffic channel operative to communicatively couple the third RD port to the fourth RD port; and
    - a ranging traffic channel operative to alternate between:
      - communicatively coupling a ranging channel calculator ("RCC") of the active ranging device to the second RD port for transmitting a first ranging signal to the first passive optical coupler device via the second media link and receiving the first ranging signal back from the first passive optical coupler device via the second media link; and
      - communicatively coupling the RCC to the fourth RD port for transmitting a second ranging signal to the second passive optical coupler device via the fifth media link and receiving the second ranging signal back from the second passive optical coupler device via the fifth media link.

20. The system of claim 19, wherein the ranging traffic channel comprises at least one of the following for enabling the alternation:
- a wavelength tunable network interface module; and
- an optical switch.

* * * * *